US012528501B2

(12) United States Patent
Hanasoge Shankaranarayana Rao et al.

(10) Patent No.: US 12,528,501 B2
(45) Date of Patent: Jan. 20, 2026

(54) OPTIMIZATIONS FOR REAL-TIME SENSOR FUSION IN VEHICLE UNDERSTANDING MODELS

(71) Applicant: GM Cruise Holdings LLC, San Francisco, CA (US)

(72) Inventors: Ajaya Hanasoge Shankaranarayana Rao, Sunnyvale, CA (US); Navaneeth Bodla, Redwood City, CA (US); Gia Tri Nguyen, Kirkland, WA (US); Xi Yi, Mountain View, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 229 days.

(21) Appl. No.: 18/326,922

(22) Filed: May 31, 2023

(65) Prior Publication Data
US 2024/0400088 A1    Dec. 5, 2024

(51) Int. Cl.
*B60W 60/00*    (2020.01)
*G06V 10/764*    (2022.01)
(Continued)

(52) U.S. Cl.
CPC ......... *B60W 60/001* (2020.02); *G06V 10/764* (2022.01); *G06V 10/82* (2022.01);
(Continued)

(58) Field of Classification Search
CPC ......... B60W 60/001; B60W 2420/403; B60W 2554/80; B60W 2556/35; G06V 10/764;
(Continued)

(56) References Cited

U.S. PATENT DOCUMENTS 10,852,743 B2    12/2020  Creusot et al.
2020/0116836 A1*  4/2020  Pacala ............ H10F 39/806
(Continued)

OTHER PUBLICATIONS

Vaswani et al., *Attention is All You Need*, 31st Conference on Neural Information Processing Systems (NIPS 2017), Long Beach, CA, USA, 15 pages.
(Continued)

*Primary Examiner* — Andrew R Dyer
(74) *Attorney, Agent, or Firm* — CANTOR COLBURN LLP

(57) ABSTRACT

Autonomous vehicles utilize perception and understanding of vehicles to predict behaviors of the vehicles, and to plan a trajectory. Understanding of attributes of vehicles may be improved through sensor fusion. Sensor fusion can be computationally expensive and may be difficult to implement in a real-time vehicle understanding system. To limit computational complexity while benefiting from machine learning across modalities, sensor fusion may be selectively implemented for a subset of task groups of a multi-task machine learning model. In some cases, part-based understanding may be implemented before fusion to limit the features being fused together to part features that are most salient for the task group. In addition, sensor data and features that may be fused together can be limited to sensor data and features within a desired field of view. A model that implements sensor fusion may be disabled for objects that are beyond a threshold distance.

16 Claims, 10 Drawing Sheets

(51) Int. Cl.
*G06V 10/82* (2022.01)
*G06V 20/58* (2022.01)
(52) U.S. Cl.
CPC ....... *G06V 20/58* (2022.01); *B60W 2420/403* (2013.01); *B60W 2554/80* (2020.02); *B60W 2556/35* (2020.02)
(58) Field of Classification Search
CPC ...... G06V 10/82; G06V 10/454; G06V 20/58; G06V 20/56
USPC .......................................................... 701/23
See application file for complete search history.

(56) References Cited

U.S. PATENT DOCUMENTS

| | | | | |
|---|---|---|---|---|
| 2021/0009143 | A1* | 1/2021 | Niewiadomski | B60W 50/14 |
| 2021/0166426 | A1* | 6/2021 | Mccormac | G05D 1/2437 |
| 2022/0051037 | A1 | 2/2022 | Creusot et al. | |
| 2022/0283311 | A1* | 9/2022 | Zhou | G01S 7/4817 |
| 2023/0135234 | A1* | 5/2023 | Wang | G06V 10/774 |
| | | | | 382/103 |
| 2023/0145535 | A1* | 5/2023 | Hatamizadeh | G06N 3/02 |
| | | | | 514/460 |
| 2023/0162508 | A1* | 5/2023 | Xia | B60W 60/00274 |
| | | | | 382/104 |
| 2023/0260147 | A1* | 8/2023 | Kido | G06T 7/0004 |
| | | | | 382/103 |
| 2024/0062504 | A1* | 2/2024 | Park | G06V 10/82 |
| 2024/0062520 | A1* | 2/2024 | Park | B60R 1/28 |
| 2024/0127596 | A1* | 4/2024 | Singh | G06T 7/74 |
| 2024/0127597 | A1* | 4/2024 | Singh | G06V 10/7715 |
| 2024/0161334 | A1* | 5/2024 | Thawakar | G06V 20/582 |
| 2024/0378799 | A1* | 11/2024 | Li | G06T 7/50 |
| 2025/0123605 | A1* | 4/2025 | Nilsson | G06N 20/20 |

OTHER PUBLICATIONS

Rajan et al., *Is Cross-Attention Preferable to Self-Attention for Multi-Modal Emotion Recognition?*, arXiv:2202.09263v1 [cs.LG], Feb. 18, 2022, 5 pages.

Li et al., *DeepFusion: Lidar-Camera Deep Fusion for Multi-Modal 3D Object Detection*, arXiv:2203.08195v1 [cs.CV], Mar. 14, 2022, 12 pages.

* cited by examiner

OPTIMIZATIONS FOR REAL-TIME SENSOR FUSION IN VEHICLE UNDERSTANDING MODELS

BACKGROUND

Technical Field

The present disclosure generally relates to autonomous vehicles (AVs) and, more specifically, to vehicle understanding models for AVs.

INTRODUCTION

AVs, also known as self-driving cars, and driverless vehicles, may be vehicles that use multiple sensors to sense the environment and move without human input. Automation technology in AVs may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
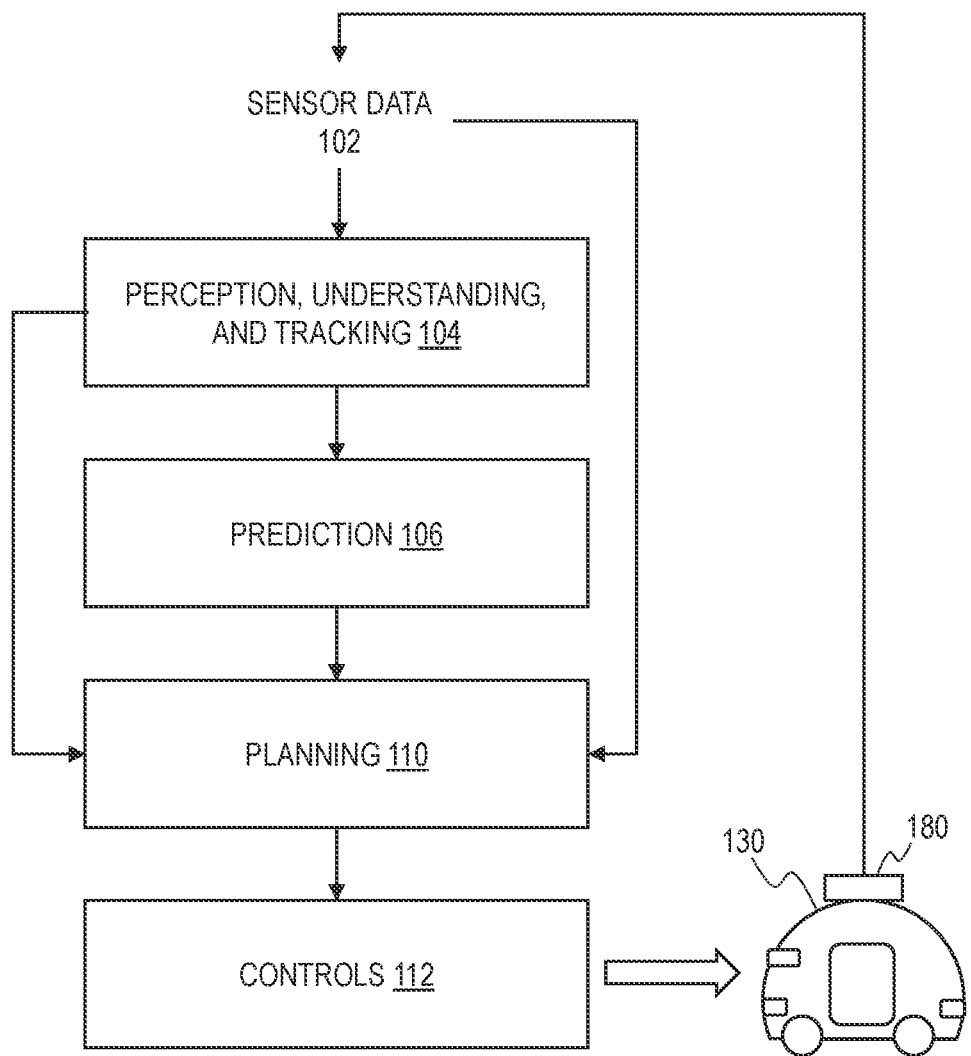
FIG. 1 illustrates an exemplary AV stack and an AV, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering an opportunity for efficient, accessible, and affordable transportation. AVs utilize perception and understanding of vehicles to predict behaviors of the vehicles, and to plan a trajectory for the AV. Vehicles have many subtypes and attributes. The subtypes and attributes can impact how an AV can navigate about its surroundings. Understanding the diversity of information about the vehicles can be challenging, especially when the AV is operating in a complex environment with many vehicles and/or when the AV is driving at relatively higher speeds. Understanding of attributes of vehicles may be improved through sensor fusion, or leverage information from sensors having different modalities. For some attributes of vehicles, understanding models may benefit from having more than camera sensor data (e.g., color images). Signal images in addition to color images may be helpful for understanding vehicle signal lights during daytime. Point clouds in addition to color images from detection and ranging sensors may be helpful for understanding whether a vehicle door is open or not. Sensor fusion can be computationally expensive and may be difficult to implement in a real-time vehicle understanding system.

To better understand vehicles in the surroundings of an AV, a multi-task machine learning model may be implemented to generate inferences for various task groups. Task groups may share a backbone and may have task group heads that can output inferences for the tasks in a given task group. To limit computational complexity while benefiting from machine learning across modalities, sensor fusion may be selectively implemented for a subset of task groups, and not for all task groups. For one or more selected task groups, sensor fusion can be performed using a cross attention neural network to align features extracted from sensor data having different modalities. Because cross attention neural network can add computational complexity, the cross attention neural network may not be implemented for all task groups. For the one or more selected task groups, sensor fusion can generate feature vectors that has joint modality information that would be unavailable otherwise (e.g., if the features from different modalities are processed separately) and can offer better performance because of the joint modality information.

In some cases, part-based understanding may be implemented before fusion to limit the features being fused together to part features that are most salient for the task group. For example, the cross attention neural network for extracting vehicle open door attributes may fuse part features relating to an open left door and part features relating to an open right door for a task group (in addition to or in lieu of global features of a vehicle) from different modalities. In some cases, the features being fused together includes part-attended feature vectors (as opposed to global features), which may encode part-aware information that can improve the performance of the task group. Preprocessing the sensor data to extract part features before fusing features from different modalities can help to simplify and reduce the information being fused together and may improve performance of the task group specific heads.

A vehicle may have point cloud data for a full 360 degrees field of view. The vehicle may have separate streams of images captured by different cameras having different fields of views. For a certain task group, a full 360-degree field of view may not be needed and may have a desired field of view that is limited. To avoid excessive computation, sensor fusion can be performed on sensor data and features that are within the desired field of view. For example, sensor data and features that may be fused together by a cross attention neural network can be limited to sensor data and features within the desired field of view (sensor data and features outside of the desired field of view do not undergo sensor fusion).

For some task groups, the inferences may not be as relevant or important depending on the vehicle of interest. For example, vehicle open door attributes may not be important for vehicles which are very far away, or which are not in front of the AV. Emergency vehicle attributes may not be important for vehicles which are far away and in front of the AV. Depending on the location of the vehicle of interest, or other contextual information, one or more models that implements sensor fusion may be disabled for objects that are beyond a threshold distance. Alternatively, the one or more models may turn off sensor fusion parts (e.g., disable a cross attention neural network, mask information from a different modality, etc.), and generate inferences based on sensor data from a single modality.

Various embodiments herein and their advantages may apply to a wide range of vehicles (e.g., semi-autonomous vehicles, vehicles with driver-assist functionalities, etc.), and not just AVs.

Exemplary AV and an AV Stack that Controls the AV

FIG. 1 illustrates an exemplary AV stack and an AV 130, according to some aspects of the disclosed technology. An AV 130 may be equipped with a sensor suite 180 to sense the environment surrounding the AV and collect information (e.g., sensor data 102) to assist the AV in making driving decisions. The sensor suite 180 may include, e.g., sensor systems 904, 906, and 908 of FIG. 9. The AV stack may include perception, understanding, and tracking part 104, prediction part 106, planning part 110, and controls part 112. The sensor data 102 may be processed and analyzed by perception, understanding, and tracking part 104 to track objects in the environment of the AV and determine a perception and understanding of the environment of the AV 130. Prediction part 106 may determine future motions and behaviors of the AV and/or tracked objects in the environment of the AV 130. The AV 130 may localize itself based on location information (e.g., from location sensors) and the map information. The planning part 110 may create planned paths or trajectories based on one or more of: information from perception, understanding, and tracking part 104, information from prediction part 106, the sensor data 102, map information, localization information, etc. Subsequently, planned paths or trajectories can be provided to controls part 112 to generate vehicle control commands to control the AV 130 (e.g., for steering, accelerating, decelerating, braking, turning on vehicle signal lights, etc.) according to the planned path.

The operations of components of the AV stack may be implemented using a combination of hardware and software components. For instance, an AV stack performing the perception, understanding, prediction, planning, and control functionalities may be implemented as software code or firmware code encoded in non-transitory computer-readable medium. The code for AV stack may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network. At least a part of the AV stack may be implemented on local computing device 910 of FIG. 9. At least a part of the AV stack may be implemented on the computing system 1000 of FIG. 10 and/or encoded in instructions of storage device 1030 of FIG. 10.

Exemplary Perception, Understanding, and Tracking Architecture

Figure 2:
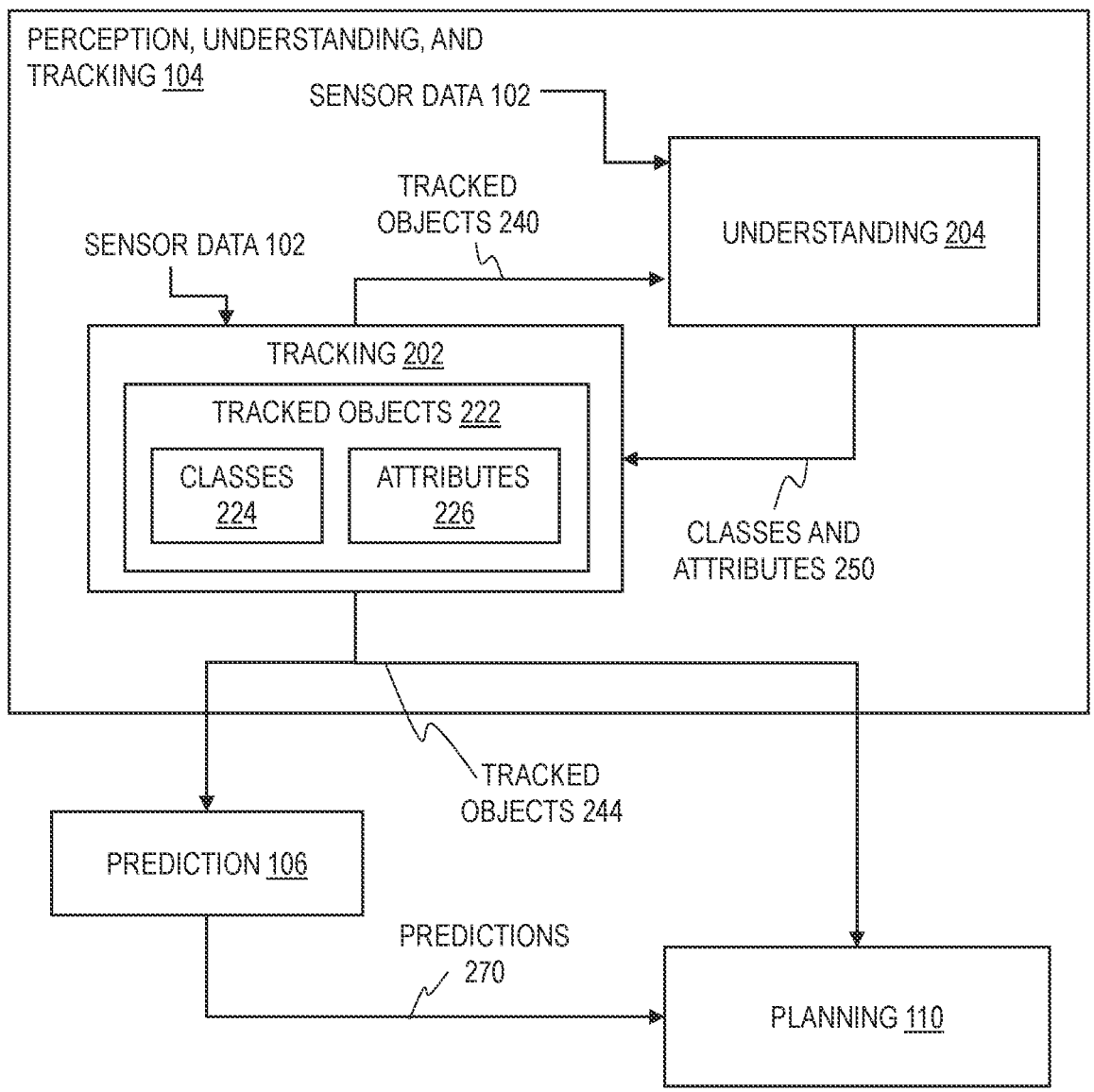
FIG. 2 illustrates an exemplary implementation of perception, understanding, and tracking part 104, prediction part 106, and planning part 110, according to some aspects of the disclosed technology.

FIG. 2 illustrates an exemplary implementation of perception, understanding, and tracking part 104, prediction part 106, and planning part 110, according to some aspects of the disclosed technology. The figure illustrates one exemplary configuration and arrangement of parts within an AV stack and is not intended to be limiting to the disclosure.

Perception, understanding, and tracking part 104 may include tracking part 202 and understanding part 204. Tracking part 202 may receive sensor data 102 from a sensor suite of an AV (the sensor suite may include, e.g., sensor systems 904, 906, and 908 of FIG. 9). Tracking part 202 may determine from the sensor data 102 presence of objects in an environment of the AV and track the objects presence over time (or across frames of data). The presence of an object can be encoded as a bounding box defining boundaries and location of an object in a three-dimensional space. The presence of an object can be encoded as location information and size information that specify the object's occupancy in space.

Understanding part 204 may receive sensor data 102 and optionally tracked objects information 240 (of tracked objects 222) to understand the objects in the environment of the AV. Understanding part 204 may process sensor data 102, e.g., using one or more machine learning models, to produce inferences about the tracked objects 222, such as one or more classes and/or one or more attributes for tracked objects 222. Understanding part 204 may provide classes and attributes 250 as feedback information to tracking part 202. Directly or indirectly, classes and attributes 250 produced by understanding part 204 may be provided to prediction part 106 and/or planning part 110 to assist prediction and/or planning functionalities respectively.

As illustrated in the figure, tracking part 202 may serve as a classes and attributes collector and can collect and maintain classes 224 and/or attributes 226 for tracked objects 222. The objects and information associated with the objects may be maintained as tracked objects 222 in tracking part 202. Tracked objects 222 may be in a format of a database or collection of data that includes data entries for tracked objects 222, where each data entry for a tracked object may include information for the tracked object, such as an object identifier of the tracked object, bounding box of the tracked object, one or more classifications of the tracked object, and one or more attributes of the tracked object. Tracked objects 222 may be in a different format, e.g., such as a grid map or raster map of an environment surrounding the AV, whose pixels may store information for various tracked objects, such as an object identifier of the tracked object, bounding box of the tracked object, one or more classifications of the tracked object, and one or more attributes of the tracked object.

Perception, understanding, and tracking part 104 may provide tracked objects information 244 (of tracked objects 222) to prediction part 106. Perception, understanding, and tracking part 104 may provide tracked objects information 244 (of tracked objects 222) to planning part 110. Prediction part 106 may provide predictions 270 to planning part 110. Tracked objects information 240 and/or tracked objects information 244 may include at least some of the information maintained in tracked objects 222. Tracked objects information 244 provided from tracking part 202 to prediction part 106 and planning part 110 may include information produced by tracking part 202 and information produced by understanding part 204.

Exemplary Understanding Part Having Multiple Vehicle Understanding Nodes

Figure 3:
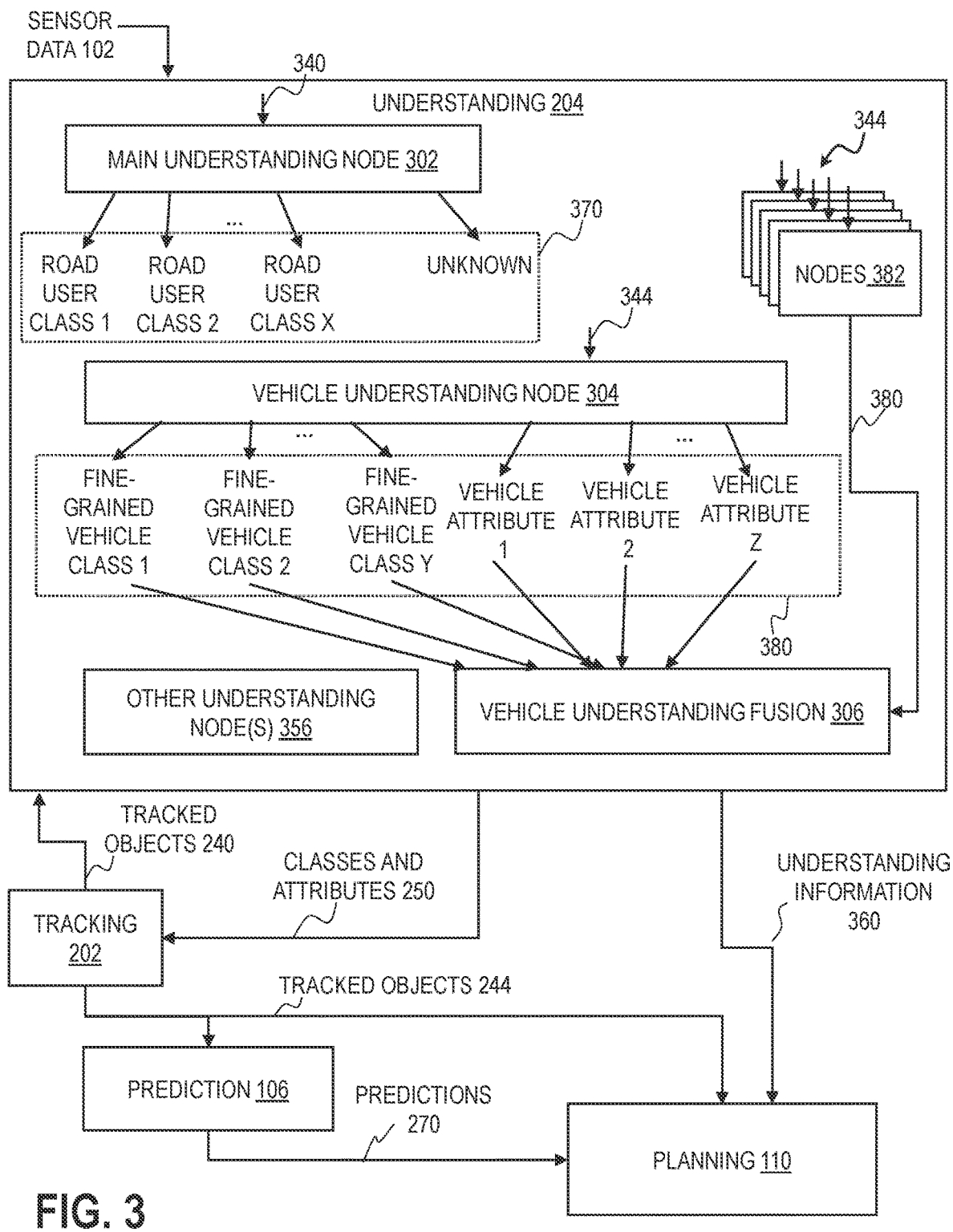
FIG. 3 illustrates an exemplary implementation of understanding part 204, tracking part 104, prediction part 106, and planning part 110, according to some aspects of the disclosed technology.

FIG. 3 illustrates an exemplary implementation of understanding part 204, tracking part 104, prediction part 106, and planning part 110, according to some aspects of the disclosed technology. The parts may form at least a part of an AV stack for an AV (not shown). The AV may have sensors, one or more processors, and one or more storage media encoding instructions executable by the one or more processors to implement one or more parts of the AV stack, such as the parts illustrated in the figure. The sensors may include, e.g., sensor systems 904, 906, and 908 of FIG. 9. The sensors may include multiple instances of the same sensor type (same modality). The sensors may include multiple sensor types (different modalities). A sensor may output sensor data having different modalities. The one or more processors and the one or more storage media may be an exemplary implementation of local computing device 910 of FIG. 9. The one or more processors and the one or more storage media may be an exemplary implementation of the computing system 1000 of FIG. 10. One or more models may be machine learning models.

The understanding part 204, tracking part 104, prediction part 106, and planning part 110 may be implemented in the form of nodes. Nodes may be instances of processes (encoded in instructions that are executable by one or more processors) that receive input data, process data, and generate output data within a larger AV computing system. Nodes may communicate over a communication network with other nodes. A node may implement one or more machine learning models. A node may consume sensor data. A node may consume information from other nodes.

The understanding part 204 may include a main understanding node 302. The main understanding node 302 may classify a tracked object into at least one of: one or more road user classifications, and an unknown road user/object classification. The one or more road user classifications may include, e.g., a bicycle classification, a motorcycle classification, a vehicle classification, a vulnerable road user classification, etc. In some cases, the main understanding node 302 may receive sensor data 340 that corresponds to a tracked object. Main understanding node 302 may have one or more outputs 370 that produce one or more inferences on the tracked object, e.g., whether the tracked object represented in the input sensor data 340 belongs to one or more classes or classifications. As illustrated, main understanding node 302 may output an inference that assigns the tracked object to one of several classes, e.g., road user class 1, road user class 2, . . . road user class X, and unknown class. Preferably, the main understanding node 302 can identify road users in the environment of the AV. Examples of road user classes may include: vehicle class, bicycle class, motorcycle class, vulnerable road user class, etc. Inferences from one or more outputs 370 may be provided to tracking part 202.

One or more vehicle understanding nodes, such as vehicle understanding node 304 and other vehicle understanding nodes 382, may be implemented in understanding part 204 to produce vehicle-specific inferences. The vehicle understanding nodes may receive sensor data that correspond to tracked objects that have been classified by the main understanding node 302 to be a vehicle. Vehicle-specific inferences may include, e.g., vehicle subtype classifications and vehicle attributes. The vehicle understanding nodes may process sensor data from different sensors or different combinations of sensors. The vehicle understanding nodes may implement different models or techniques to generate inferences about vehicles.

In some embodiments, a vehicle understanding node may classify a tracked object with vehicle classification assigned or inferred by the main understanding node 302, into one or more vehicle subtype classes. Examples of vehicle subtype classes can include, e.g., car, truck, light rail vehicle, emergency medical vehicle, school bus, train, etc. The vehicle understanding node may extract one or more vehicle attributes about the tracked object. A vehicle understanding node may receive sensor data 344 (generated from the sensors of the AV) corresponding to tracked objects having the vehicle classification, such as a tracked object that has been classified by main understanding node 302 as having the vehicle classification. A vehicle understanding node may have one or more outputs 380 that produce one or more inferences on the tracked object having the vehicle classification.

Exemplary inferences in outputs 380 may include whether the tracked object represented in the input sensor data 344 belongs to one or more vehicle subtype classes or classifications. Exemplary inferences in outputs 380 may include whether the tracked object represented in the input sensor data 344 has certain vehicle attributes or properties. A vehicle understanding node, such as the vehicle understanding node 304 as shown, may output an inference that assigns the tracked object having a vehicle classification to one of several vehicle subtype classes, e.g., fine-grained vehicle class 1, fine-grained vehicle class 2, . . . and fine-grained vehicle class Y. A vehicle understanding node, as the vehicle understanding node 304 as shown, may output inferences about one or more attributes (or properties) of the tracked object, e.g., vehicle attribute 1, vehicle attribute 2, . . . and vehicle attribute Z. Outputs 380, e.g., encoding inferences of a vehicle understanding node, may indicate discrete classes (e.g., a class) and/or continuous values (e.g., a probability or likelihood).

A vehicle understanding node may be a multi-task learning model to generate inferences on vehicles and produce meaningful and rich inferences that can support other parts of the AV stack. Tasks being performed by the multi-task learning model may output respective inferences. Tasks producing inferences may be arranged or assigned into one or more task groups. In other words, a task group may include one or more tasks, or may generate one or more inferences corresponding to the tasks of the task group. Parts (e.g., layers, or networks) of the multi-task learning model may be dedicated to processing data, extracting features, and/or generating inferences of respective task groups. Tasks in a task group may share a part of the multi-task learning model dedicated to the task group.

As a multi-task learning model, a vehicle understanding node may include a backbone, and a plurality of heads to output inferences for different tasks. The backbone may be shared across the tasks of the vehicle understanding node. In some cases, the tasks may be grouped into task groups, and the vehicle understanding node may include task group specific heads to output inferences for respective task groups. The backbone may receive and process sensor data 344 generated from the sensors corresponding to tracked objects having the vehicle classification. If desired, the vehicle understanding node may include one or more temporal networks. A temporal network may be shared across all tasks and task groups. A temporal network may be dedicated to a task or a task group. A temporal network dedicated to a task may process an output of the shared backbone and provide an output to a head that is outputting an inference for the task. A temporal network dedicated to a task group may process an output of the shared backbone and provide an output to heads that are outputting inferences for the tasks in the task group. The inferences may include one or more vehicle subtype classifications and one or more vehicle attributes.

For a vehicle that is in the environment of an AV, one feature of the vehicle may be captured by sensor data of one camera in the sensor suite of the AV, and another feature of the vehicle may be captured by sensor data of another camera in the sensor suite of the AV. In some cases, the same feature of the vehicle may be captured by sensor data of two different cameras in the sensor suite of the AV (due to overlapping field of views of the cameras). In some cases, a feature of a vehicle may be occluded in sensor data of one camera in the sensor suite but is not occluded in sensor data of another camera in the sensor suite. Some vehicle understanding nodes may operate on the same sensor data as sensor data 344 but implement different understanding models and output different sets of inferences (e.g., generate inferences for different task groups). Such nodes may help extract different kinds of inferences from the same sensor data. Some vehicle understanding nodes may output the same set of inferences (e.g., generate inferences for the same set of task group(s)), but operate on different sensor data as sensor data 344. Such nodes may help extract the same kinds of inferences from different sensor data, so that the inferences can be fused to form final inferences about vehicles in the surroundings of the AV.

A vehicle understanding node can perform feature extraction based on sensor data that is generated by a first sensor of the AV. Another vehicle understanding node can perform feature extraction based on sensor data generated by a second sensor of the AV. A vehicle understanding node can perform feature extraction based on sensor data having a first modality. Another vehicle understanding node can perform feature extraction based on sensor data having a second modality that is different from the first modality. Some vehicle understanding nodes may perform feature extraction of vehicles (possibly using different models or methodologies) based on the same or different sensor data produced by the sensor suite of the AV. Those vehicle understanding nodes may be generating inferences about vehicles in the environment of the AV.

The inferences in outputs 380 from the various vehicle understanding nodes, e.g., the heads of the vehicle understanding node 304 and heads of other vehicle understanding nodes 382. Inferences in outputs 380 may be provided to a vehicle understanding fusion part 306 to form final vehicle understanding inferences. Vehicle understanding fusion part 306 may implement geometric fusion reasoning to combine or relate inferences from different models corresponding to the same vehicle in the environment. Geometric fusion reasoning may include determining whether the inferences correspond to locations on the same bounding box of a vehicle. The bounding box information (including, e.g., coordinates information, height information, width information, and height information based on a reference coordinate system) corresponding to the vehicle may be determined and provided, by tracking part 202, to the vehicle understanding fusion part 306. Vehicle understanding fusion part 306 may map locations of the inferences onto the reference coordinate system of the bounding box information to determine whether the inferences belong to the same vehicle. Vehicle understanding fusion part 306 may implement semantic reasoning to relate or fuse inferences from different models corresponding to the same vehicle in the environment. Semantic fusion reasoning may include determining whether the inferences corresponding to the same vehicle together indicate a different semantic meaning than the inferences alone. For example, semantic fusion reasoning may combine a left-blinker light is on attribute of a vehicle from one model and a right-blinker light is on attribute of the same vehicle inferred by a different model and infer a hazard lights are on attribute for the vehicle. Semantic fusion reasoning may combine a flashing top light active attribute of a vehicle inferred by one model, and a commercial security vehicle subtype classification of the same vehicle inferred by a different model and infer that the vehicle is an active commercial security vehicle (as opposed to inferring that the vehicle is an active law enforcement vehicle).

Vehicle understanding fusion part 306 may output fused inferences (e.g., final vehicle understanding inferences) about the vehicles in the environment of the AV. The fused inferences may be consumed by one or more downstream models.

Inferences of Vehicles and Task Grouping Considerations

Vehicle understanding nodes may be implemented to produce many inferences about tracked objects with the vehicle classification. Inferences can include classifications (e.g., whether a tracked object belongs to or matches a certain subtype class or classification out of a set of classifications), and attributes (e.g., whether a tracked object has a certain attribute or property). A tracked object can belong to a class or classification and may have one or more attributes. A vehicle understanding node may produce a continuous value (or probability) that a tracked object belongs to or matches a certain subtype class or classification. A vehicle understanding node may produce a vehicle subtype inference that that selects a vehicle subtype classification between two or more vehicle subtype classifications (e.g., outputs a classification to which a given tracked object most likely belong or has the best match). The vehicle understanding node may produce a continuous value (or probability) that a tracked object exhibits a certain attribute or property. A vehicle understanding node may produce a binary value indicating whether a tracked object exhibits a certain attribute or property. A task refers to the production of an inference by a multi-task learning model. In some cases, attributes may represent sub-classes or sub-classifications of vehicle understanding subtype class.

As a multi-task learning model, a vehicle understanding node may perform many tasks. The vehicle understanding node 304 may have heads (sometimes referred to as task heads) as the output networks that are generating the inferences.

Exemplary inferences related to vehicle understanding subtype classifications can include:
  Train classification,
  Light rail vehicle classification,
  Commuter bus classification,
  School bus classification,
  Truck classification,
  Heavy vehicle classification,
  Emergency vehicle classification,
  Ambulance vehicle classification,
  Law enforcement (or police) vehicle classification,
  Military vehicle classification,
  Fire truck vehicle classification,
  Commercial security vehicle classification,
  Farm vehicle classification,
  Construction vehicle classification,
  Recreational vehicle classification,
  Tow truck vehicle classification,
  Parking enforcement vehicle classification,
  Utility vehicle classification,
  Other or unknown vehicle classification, and
  Car classification (personal vehicle).

Exemplary inferences related to vehicle understanding attributes can include:
  Emergency vehicle subtype classification or attribute: whether an emergency vehicle is an ambulance,
  Emergency vehicle subtype classification or attribute: whether an emergency vehicle is a law enforcement vehicle,
  Emergency vehicle subtype classification or attribute: whether an emergency vehicle is a military vehicle,
  Emergency vehicle subtype classification or attribute: whether an emergency vehicle is a fire truck,
  Emergency vehicle attribute: whether an emergency vehicle is active,
  Emergency vehicle attribute: whether an emergency vehicle is not active,
  Emergency vehicle subtype classification or attribute: whether an emergency vehicle is intentionally blocking traffic,
  Emergency vehicle subtype classification or attribute: whether an emergency vehicle is intentionally blocking traffic,
  Emergency vehicle subtype classification or attribute: whether an emergency vehicle has flashing lights on,
  Vehicle signal attribute: whether a vehicle has a left-blinker light on,
  Vehicle signal attribute: whether a vehicle has a right-blinker light on,
  Vehicle signal attribute: whether a vehicle has a hazards light on,
  Vehicle signal attribute: whether a vehicle has a brake light on,
  Vehicle signal attribute: whether a vehicle has reverse lights on,
  Vehicle signal attribute: whether the brake light on a vehicle is flashing (driver is tapping on the brakes),
  Vehicle signal attribute: whether the brake light on a vehicle is flashing (driver is tapping on the brakes),
  Vehicle signal attribute: whether a vehicle intends to perform a driving maneuver that would require turning on left-blinker light but does not actually turn on the left-blinker light,
  Vehicle signal attribute: whether a vehicle intends perform a driving maneuver that would require turning on right-blinker light but does not actually turn on the right-blinker light,
  Vehicle signal attribute: whether a vehicle has driving lights on,
  Vehicle signal attribute: whether a vehicle has driving lights off,
  Vehicle signal attribute: whether a vehicle has high beams on,
  Vehicle signal attribute: whether a vehicle is flashing high beams,
  Vehicle signal attribute: whether a vehicle is a miscellaneous flashing light bar on,
  School bus flashing light attribute: whether a school bus has red lights on,
  School bus flashing light attribute: whether a school bus has yellow lights on,
  School bus flashing light attribute: whether a school bus have neither red nor yellow lights on,
  School bus activeness attribute: whether a school bus is active (picking up students or dropping off students),
  School bus activeness attribute: whether a school bus has an open STOP SIGN,
  School bus activeness attribute: whether a school bus has a closed STOP SIGN,
  School bus activeness attribute: whether a school bus is active (picking up students or dropping off students),
  Vehicle attribute: whether a vehicle is a delivery vehicle,
  Vehicle attribute: whether a vehicle is not a delivery vehicle,
  Vehicle attribute: whether a vehicle has an object (e.g., in a truck bed, on top of vehicle, etc.),
  Vehicle attribute: whether a vehicle is a trailer,
  Vehicle attribute: whether a vehicle is controlling another vehicle,
  Vehicle attribute: whether a vehicle is being controlled by another vehicle,
  Vehicle attribute: whether a vehicle is carrying an extra heavy load,
  Vehicle attribute: whether a vehicle is carrying an extra long load,
  Vehicle attribute: whether a vehicle is towing another vehicle or wheeled body,
  Vehicle attribute: whether a vehicle is carrying an oddly shaped load,
  Vehicle open door attribute: whether a left door of a vehicle is open,
  Vehicle open door attribute: whether a right door of a vehicle is open,
  Vehicle open door attribute: whether a trunk door of a vehicle is open,
  Vehicle open door attribute: whether a hood of a vehicle is open, and
  Vehicle open door attribute: whether a roof of a vehicle is open.

A vehicle understanding node may be generating many inferences through many tasks. It is not desirable to dedicate machine learning networks in a vehicle understanding node to each task, because the computational complexity would be very high, and may result in overfitting of the model to individual tasks (as if there were separate models for the tasks). By carefully grouping tasks into task groups, tasks in a specific task group may share the dedicated parts of the multi-task learning model for the task group, avoid overfitting, and reduce the computational complexity of the multi-task learning model. The vehicle understanding node 304 may generate inferences for two or more task groups. In some embodiments, the vehicle understanding node 304 may generate inferences for four task groups. If the tasks are not grouped into task groups, the multi-task learning model may provide many dedicated parts to the tasks individually, which can significantly increase computational complexity without significant improvement in performance of the individual tasks.

Arranging and defining the task groups are not trivial. Since each task group may have dedicated networks to learn features for the task group, computational complexity can be high if there are too many task groups. Not implementing enough task groups may mean that performance of the task group may suffer, since the learning for all the tasks in a task group may become over generalized. Offering dedicated networks for task groups allows for configurability (e.g., tuning for specific task groups), which may offer some efficiencies if the dedicated networks can be configured to reduce excessive or unnecessary processing for the required performance. Providing dedicated networks also may offer machine learning of features that would be specific to the task group, which may improve precision and recall performance of the task groups.

Preferably, tasks that may be similar in nature may be grouped into a task group. Tasks that are extracting classifications and/or attributes that are more static in nature may be grouped into a task group. Fine-grained vehicle subtype classification may be more static in nature. Tasks that are extracting attributes that are related to the same kind of vehicle may be grouped into a task group. Tasks that are classifying vehicles as school buses and extracting school bus related attributes may relate be grouped into a task group. Tasks that are classifying vehicles as different emergency vehicle subtype classifications and extracting emergency vehicle attributes may relate be grouped into a task group. Tasks that are extracting attributes that may rely on a longer sequence of images (e.g., vehicle signal attributes) may be grouped into a task group. A given task may be added to a task group to ensure that the given task does not get overpowered by the loss function of another task in the same task group.

Some tasks may be grouped into a task group if the tasks may benefit from task group specific sensor fusion. For example, some tasks may benefit from having both color images and signal images as the input sensor data, and fusion of features from both modalities. In another example, some tasks may benefit from having both point cloud data and color images as input sensor data, and fusion of features from both modalities. By consolidating such tasks into a task group, sensor fusion of features extracted from sensor data having different modalities may be limited to and configured specifically for certain task groups only (as opposed to performing sensor fusion for every task or task group). Sensor fusion can be applied strategically to task groups that would benefit from sensor fusion, while avoiding adding sensor fusion to task groups that would not benefit from sensor fusion (thereby avoiding unnecessarily adding computational complexity with no benefit to performance).

In some embodiments, a vehicle understanding node (e.g., nodes shown in FIGS. 4, 5, and 7) may output inferences for one or more task groups. Task grouping may take into account some of the considerations mentioned above. Exemplary task groups can include:
- a first task group to extract an emergency vehicle classification, extract emergency vehicle subtype classifications, and extract one or more emergency vehicle flashing light attributes,
- a second task group to extract vehicle signal attributes,
- a third task group to extract school bus classification, extract one or more school bus flashing light attributes, and extract one or more school bus activeness attributes,
- a fourth task group to extract vehicle subtype classifications and extract one or more vehicle attributes,
- a fifth task group to extract vehicle subtype classifications, and
- a sixth task group to extract one or more vehicle open door attributes.

Exemplary Downstream Consumers of Vehicle Understanding Nodes or Vehicle Understanding Fusion Part Inference(s) produced by vehicle understanding nodes can advantageously be used by one or more downstream understanding nodes to better understand the environment surrounding an AV. Referring back to FIG. 3, understanding part 204 may include other understanding node(s) 356. The other understanding node(s) 356 may process sensor data and/or other information to understand interactions of, connections between, or relationships between, various vehicles on the road. For example, the other understanding node(s) 356 may infer whether one vehicle controls another vehicle, or one vehicle is controlled by another vehicle. The other understanding node(s) 356 may produce understanding information 360 to downstream parts such as, tracking part 202, prediction part 106, and planning part 110.

The other understanding node(s) 356 may be an interactions/relationship understanding sub-model, which may process sensor data and/or other information to understand relationships and interactions between different road users. For example, interactions and relationships understanding may help understand whether a vehicle will yield to the AV making a lane change, understand whether a double-parked vehicle is unlikely to move, or understand if vehicles are traveling as a group (e.g., a vehicle is being towed). The other understanding node(s) 356 may receive one or more inferences from the vehicle understanding node 304. The interactions/relationships understanding sub-model may produce understanding information 360 to the prediction part 106 or planning part 110.

The other understanding node(s) 356 may be a traffic understanding sub-model, which may process sensor data and/or other information to understand situations on the road such as (temporary) traffic restrictions, construction zones, school bus pick-up situation, school bus drop-off situation, accident situation, emergency traffic situation, natural disaster situation, public safety situation, etc. The other understanding node(s) 356 may receive one or more inferences from the vehicle understanding node 304. The traffic understanding sub-model may produce one or more traffic directives (as understanding information 360) to the planning part 110.

In some embodiments, tracking part 202 may produce bounding boxes of tracked objects in the environment of the vehicle. The bounding boxes of tracked objects can be provided to the understanding part 204. The sensor data 344 at the input of vehicle understanding node 304 from the sensors corresponding to the tracked objects having the unknown object classification may be cropped. For example, sensor data 344 may include camera images cropped based on projections of bounding boxes of the tracked objects having the vehicle classification onto camera images captured by the sensors. Processing cropped images (as opposed to full images) can reduce computational complexity.

In some embodiments, the inferences of the understanding part 204 (e.g., inferences from main understanding node 302, inferences from vehicle understanding node 304, inferences from other vehicle understanding nodes 382, and inferences from other understanding node(s) 356) can be provided to the tracking part 202. Inferences may be provided as classes and attributes 250 to tracking part 202. Tracking part 202 may be a collector for classes and attributes of various tracked objects.

Prediction part 106 may receive at least one of the inferences generated by the plurality of heads and to predict behaviors of tracked objects in an environment of the vehicle. Expected behaviors and movements of road objects can be different depending on the subtype of vehicle and/or attributes of vehicle. Some inferences may impact how prediction part 106 predicts future pose and future kinematics of various types of tracked objects. For example, a vehicle that has a certain subtype classification may be predicted to decelerate slower than another vehicle that has a different subtype classification. In another example, a vehicle that is a delivery vehicle may be predicted to move slowly and may make frequent stops.

Planning part 110 may receive at least one of the inferences generated by the plurality of heads of vehicle understanding nodes (or other models in understanding part 204) and to generate a trajectory for the vehicle. Some inferences may impact how planning part 110 generates planned paths for the AV. For example, the planning part 110 may plan a path for an AV according to a school bus activeness attribute.

Exemplary Optimizations for Real-Time Sensor Fusion in Vehicle Understanding Nodes Sensor fusion at the data level (e.g., sensor data or feature vectors) can improve performance for certain tasks, but at the expense of added computational complexity. Sensor fusion implementation at the data level can be optimized for real-time operation of understanding models for AVs. FIGS. 4-8 illustrate possible optimizations that can enable sensor fusion in real-time vehicle understanding systems implemented for AVs or vehicles more generally.

Figure 4:
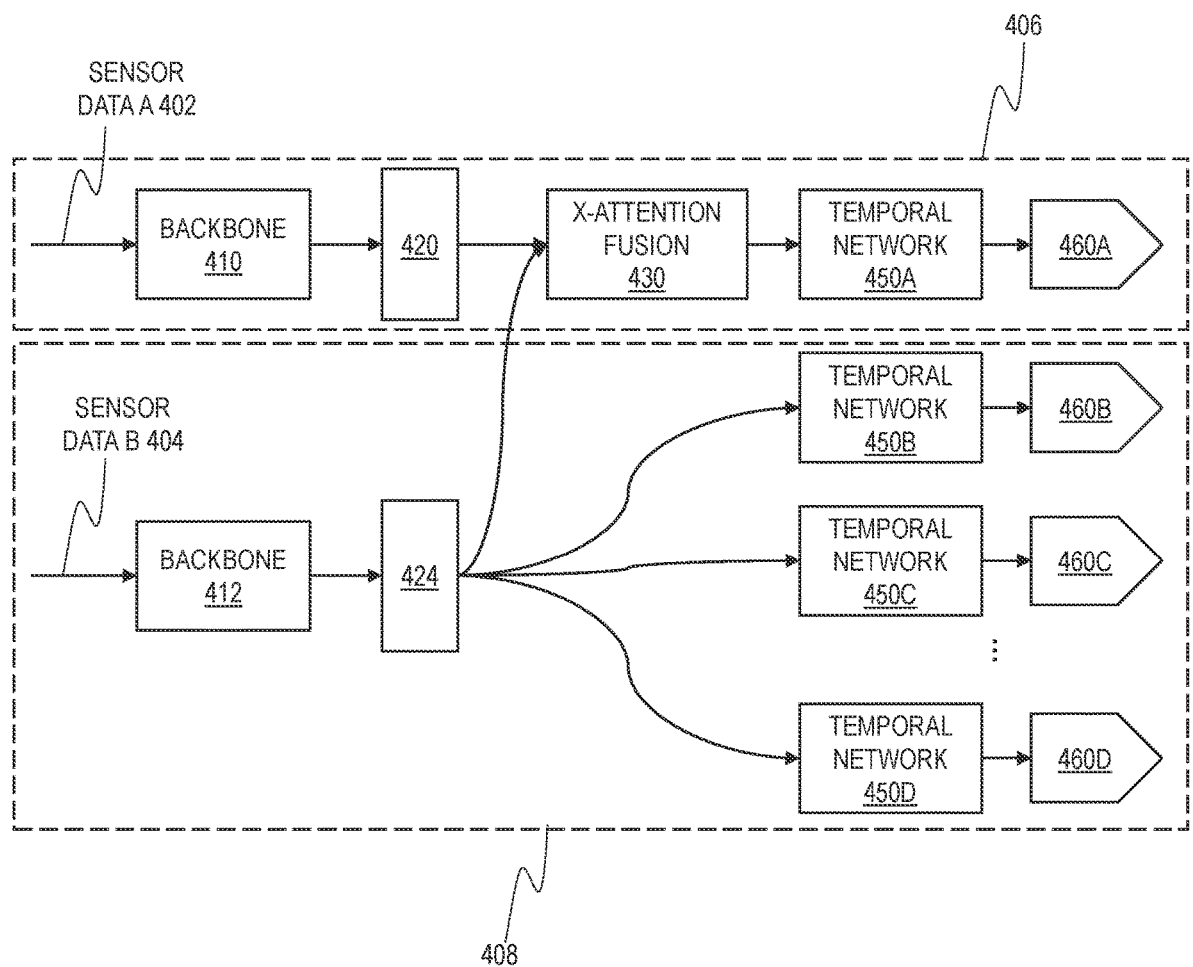
FIG. 4 illustrates sensor fusion in an exemplary multi-task machine learning model for vehicle understanding, according to some aspects of the disclosed technology.
Figure 5:
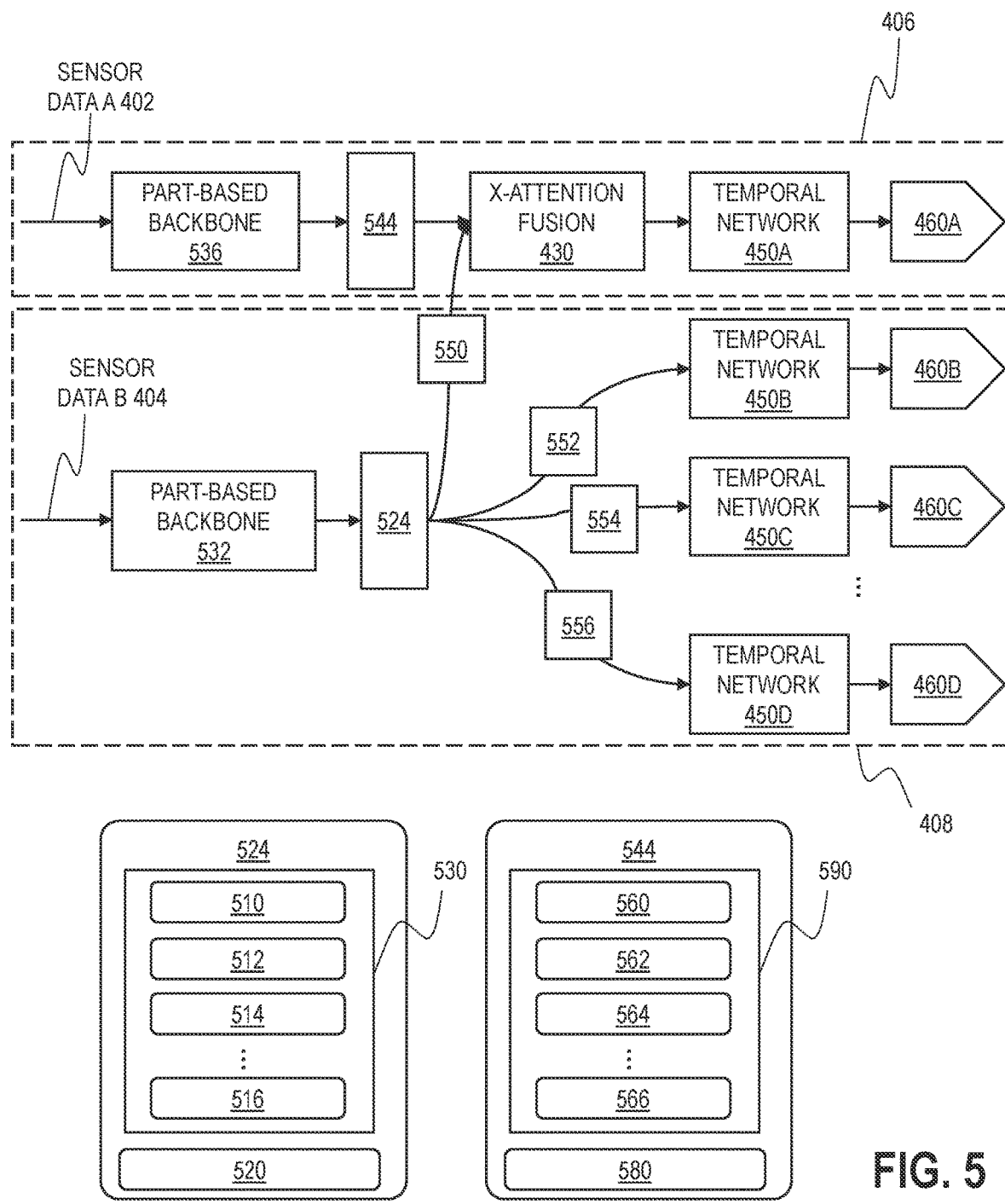
FIG. 5 illustrates sensor fusion in another exemplary multi-task machine learning model for vehicle understanding, according to some aspects of the disclosed technology.
Figure 7:
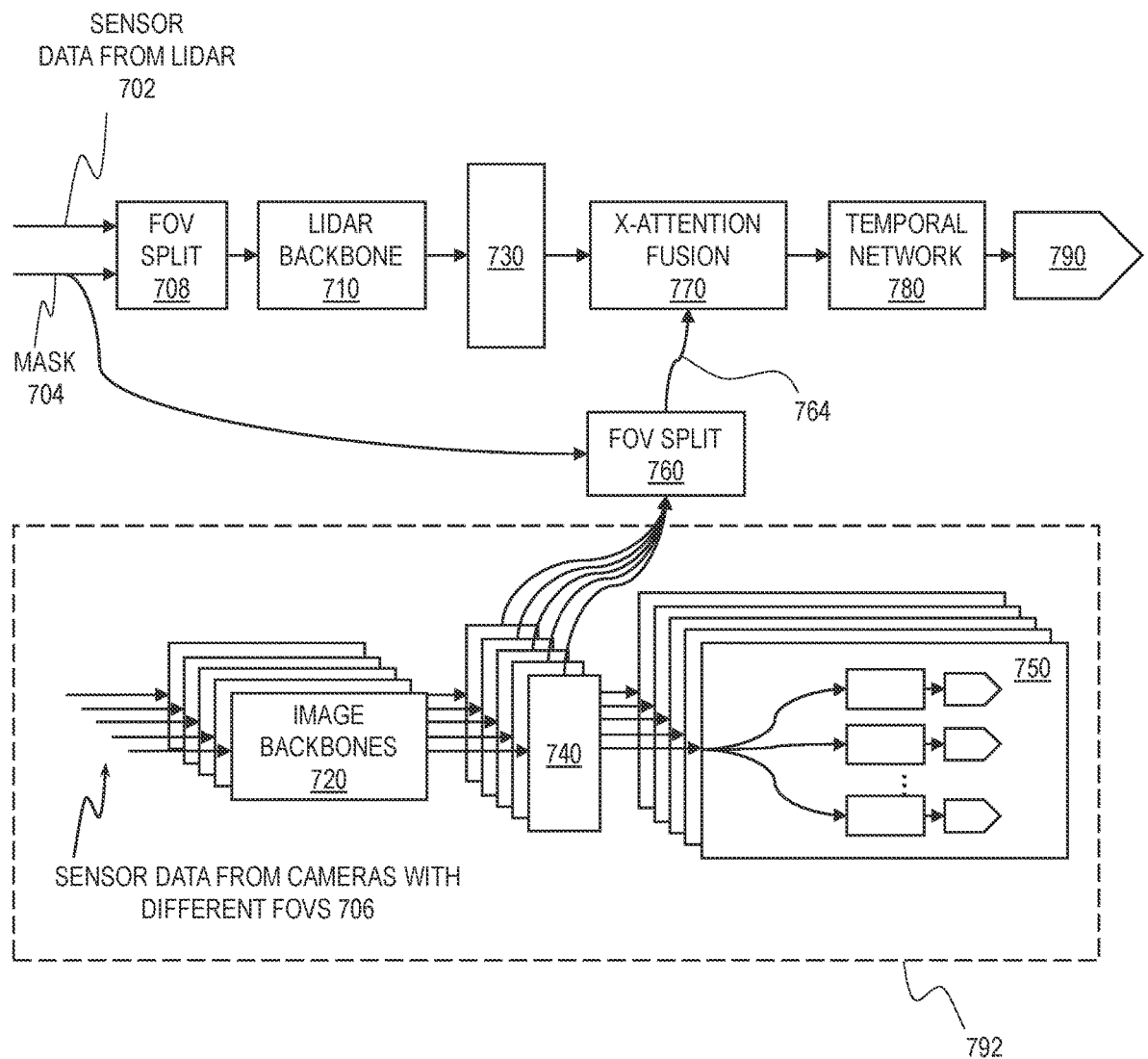
FIG. 7 illustrates sensor fusion in yet another exemplary multi-task machine learning model for vehicle understanding, according to some aspects of the disclosed technology.
Figure 9:
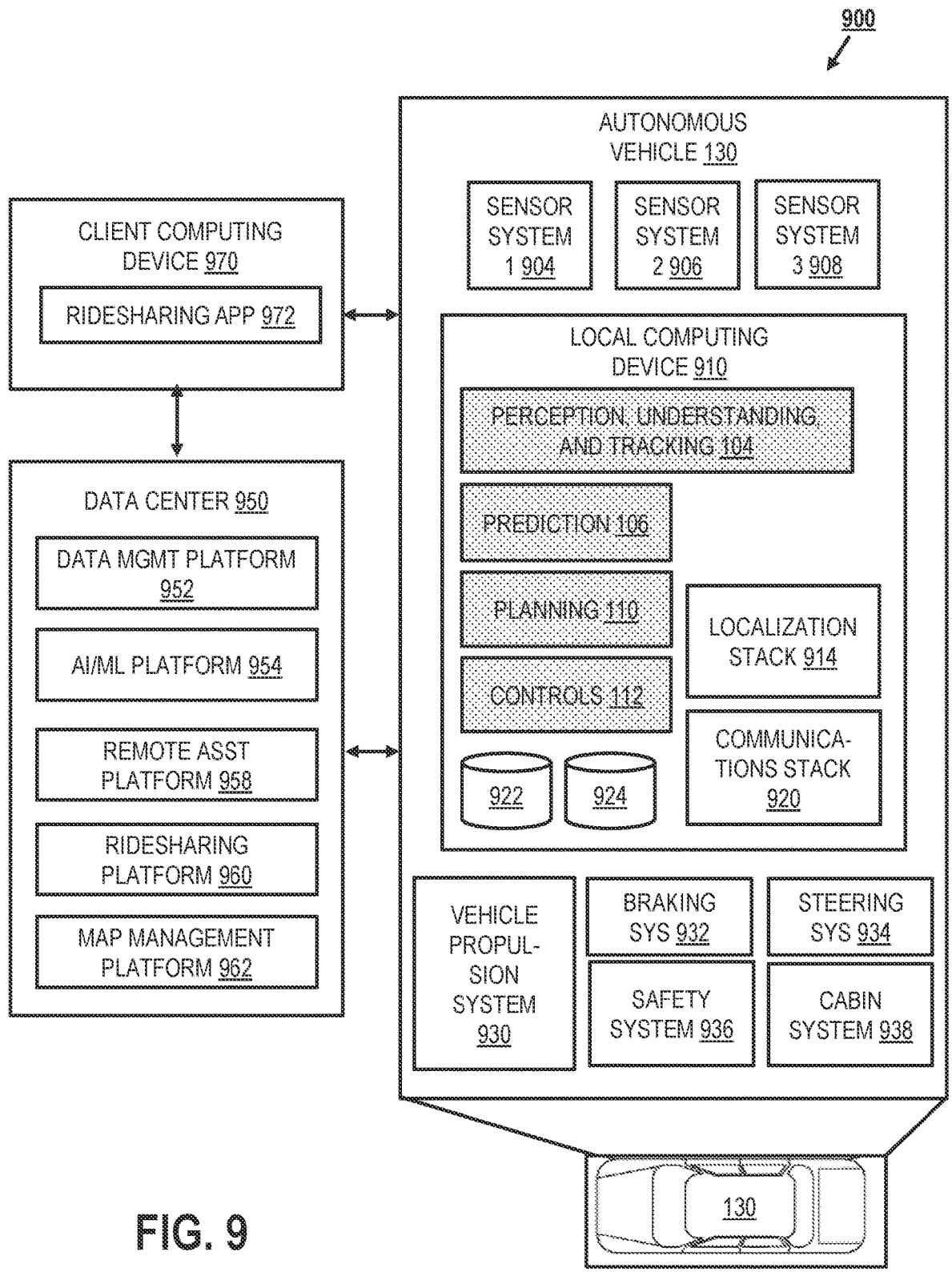
FIG. 9 illustrates an exemplary system environment that may be used to facilitate AV operations, according to some aspects of the disclosed technology.

A vehicle may include sensors, such as sensors, such as sensor systems 904, 906, and 908 of FIG. 9. Sensors may generate first sensor data in a first modality. Sensors may generate second sensor data in a second modality. The vehicle may include one or more processors, and one or more non-transient storage media encoding instructions executable by the one or more processors. The instructions may implement parts of an AV stack, such as an understanding part (e.g., understanding part 204). FIGS. 4, 5, and 7, illustrate exemplary implementations of the understanding part.

FIG. 4 illustrates sensor fusion in an exemplary multi-task machine learning model for vehicle understanding, according to some aspects of the disclosed technology. Because it may not be practical to implement sensor fusion at the data level for all tasks or task groups in a multi-task machine learning model, sensor fusion can be selectively implemented for certain task groups in a multi-task learning model. Fusion can be performed using features that are being extracted by a backbone that is already implemented for a multi-task machine learning model. Added computational complexity would be limited to tasks or task groups that may benefit from sensor fusion the most.

The illustrated implementation for sensor fusion in a multi-task learning model can include receiving first sensor data having a first modality (e.g., sensor data A 402) and second sensor data having a second modality (e.g., sensor data B 404). The multi-task learning model has task groups, and task group specific heads that output inferences for the task groups. In the illustration, task group specific heads include first task group specific heads 460A to output inferences for a first task group, second task group specific heads 460B to output inferences for a second task group, third task group specific heads 460C to output inferences for a third task group, and fourth task group specific heads 460D to output inferences for a fourth task group. Heads may include fully connected neural network layers and an output layer that outputs inferences for tasks of a corresponding task group.

The understanding part may include a first node 408 may output first inferences for a plurality of first task groups. As shown, the first node 408 may generate inferences for three separate task groups. It is envisioned that the first node 408 may generate inferences for two or more separate task groups and is not limited to the embodiment shown. The first node 408 may include a first shared backbone 412 to receive and process sensor data B 404. Sensor data B 404 may correspond to tracked objects having the vehicle classification. In some cases, sensor data B 404 may correspond to tracked objects generally. The first shared backbone 412 may include a deep neural network (e.g., multi-layer perceptrons, convolutional neural network, residual neural network, etc.). The first shared backbone 412 may extract first features from sensor data B 404. Features extracted by the first shared backbone 412 may be represented as first feature vector 424. First node 408 may include task group specific heads, downstream of the first shared backbone 412, to output first inferences for the first task groups. As illustrated, first node 408 includes second task group specific heads 460B, third task group specific heads 460C, and fourth task group specific heads 460D.

The understanding part may include a second node 406 to output second inferences for a second task group. As shown, the second node 406 may generate inferences for a single task group. It is envisioned that the first node 408 may generate inferences for two or more separate task groups and is not limited to the embodiment shown. The second node 406 may include a second backbone 410 to receive and process sensor data A 402. Sensor data A 402 may correspond to tracked objects having the vehicle classification. In some cases, sensor data A 404 may correspond to tracked objects generally. The second backbone 410 may include a deep neural network (e.g., multi-layer perceptrons, convolutional neural network, residual neural network, etc.). The second backbone 410 may extract second features from sensor data A 402. Second features extracted by the second backbone 410 may be represented as second feature vector 420. The second node 406 may include heads, downstream of the second backbone 410, to output second inferences for the second task group. For example, the second node 406 may include first task group specific heads 460A.

Inferences for the second task group (e.g., inferences generated by heads in the second node 406) may benefit from sensor fusion. To fuse information at the data level, the second node 406 may further include a cross attention neural network, e.g., x-attention fusion part 430, to receive first features from the first shared backbone 412 (e.g., first feature vector 424) and second features from the second backbone 410 (e.g., second feature vector 420). The cross attention neural network can encode attention relationships between the first features and the second features, and outputs fused features based on the attention relationships. The cross attention neural network may be based on a transformer model. The attention relationships can be learned through training of the cross attention neural network through machine learning. The attention relationships may be encoded in one or more attention matrices. Values in the attention matrices may be computed through supervised training. The cross attention neural network may advantageously align information in the first features and information in the second features, and output the fused features (e.g., a fused feature vector) that combines information from the first features and the second features, even if the position of salient or important information are in positioned differently in the first features and the second features. Heads, e.g., first task group specific heads 460A, may be downstream of the cross attention neural network, and output inferences based on data that includes information from sensor data A 402 and sensor data B 404. The inferences generated by first task group specific heads 460A thus can benefit from sensor fusion at the data level and take advantage of the joint information present in the first features and the second features. The first task group specific heads 460A may produce inferences with higher precision and recall metrics because the fused features may have strong signals that can improve classification and extraction of attributes.

In some embodiments, the first node 408 may include one or more temporal networks. As shown, the first node 408 includes temporal networks dedicated to respective task groups of the first node 408. The first node 408 can include a temporal network 450B upstream of heads 460B and dedicated to the task group of heads 460B. The first node 408 can include a temporal network 450C upstream of heads 460C and dedicated to the task group of heads 460C. The first node 408 can include a temporal network 450D upstream of heads 460D and dedicated to the task group of heads 460D. Temporal networks in the first node 408 may process feature vectors from backbone 412 at a plurality of timestamps to extract sequence or timing information in the feature vectors across time.

In some embodiments, the second node 406 may include one or more temporal networks downstream of the cross attention neural network (e.g., x-attention fusion part 430). A temporal network may be shared across multiple task groups. A temporal network may be dedicated to specific task groups. As shown, the second node 406 includes a temporal network 450A dedicated to task group of heads 460A. The temporal network 450A may process fused feature vectors from the cross attention neural network at a plurality of timestamps to extract sequence or timing information in the fused feature vectors across time.

A temporal network may be shared across multiple task groups. A temporal network may be dedicated to specific task groups. Some task groups may have dedicated temporal networks. Some task groups may not have a dedicated temporal network (a temporal network is not included or omitted for the task group). Providing dedicated temporal networks to tasks or task groups has the benefit of allowing the dedicated temporal networks to be configured differently depending on the task or task group. Temporal networks can include long short-term memory networks, multi-head attention neural networks, recurrent neural networks, etc.

In some embodiments, the second inferences being generated by heads 460A of the second node 406 may include two or more vehicle open door attributes. Sensor data A 402 may include point clouds generated by a light detection and ranging sensor. Sensor data B 404 may include image data generated by a camera. Extracting vehicle open door attributes can benefit from fusing of image data and depth data (depth data for an open door may be remarkably different from depth data for a closed door), which may provide additional information that would allow heads 460A to more accurately determine whether a vehicle door is open or not.

In some embodiments, the second inferences being generated by heads 460A of the second node 406 may include two or more vehicle signal attributes. Sensor data A 402 may include signal channel image data generated by a camera. Sensor data B 404 may include color channels image data generated by the same camera. In some cases, sensor data A 402 may include signal image data generated by a camera, and sensor data B 404 may include color image data generated by a different camera. Extracting vehicle signal attributes can benefit from fusing of color image data and signal image data, which may provide additional information that would allow heads 460A to more accurately locate vehicle signal lights during the daytime and determine the state of the vehicle signal lights.

FIG. 5 illustrates sensor fusion in another exemplary multi-task machine learning model for vehicle understanding, according to some aspects of the disclosed technology. Part-aware processing of sensor data can be implemented before sensor fusion to reduce the amount of data that has to be fused together to information that is most salient for the task group. Part-aware processing of sensor data may also improve vehicle subtype classification and extraction of vehicle attributes. Some vehicle understanding tasks or task groups may benefit from identifying states or extracting features of specific parts of a vehicle. Those tasks or task groups may benefit from inputs that exhibit strong signals for certain parts of a vehicle. Part-awareness may improve performance of certain tasks or task groups. For example, extracting emergency vehicle attributes may benefit from having features or states that are localized to a light bar of the vehicle. Extracting school bus attributes may benefit from features or states that are localized to the lights and stop sign parts of the vehicle. Extracting vehicle signal attributes may benefit from features or states that are localized to tail light areas of a vehicle. Extracting open door attributes may benefit from features or states that are localized to door areas of a vehicle. Without part-awareness, a backbone may globally average the features or states of various parts of the vehicle (e.g., potentially attenuating the signals from certain parts of the vehicle). The globally averaged features may not provide sufficient information that allows a downstream model to distinguish between different (localized) parts of a vehicle. Furthermore, global averaging of the features may obscure underlying reasons for why certain task groups are not performing well enough.

The implementation shown in FIG. 5 is similar to the implementation shown in FIG. 4, with some adjustments to the backbones to make them part-aware. Backbone in second node 406 may optionally be implemented as part-based backbone 536 in the second node 406 to include part-aware machine learning. Backbone in first node 408 can optionally be implemented as part-based backbone 532 in the first node 408 to include part-aware machine learning.

Part-aware machine learning may include detection of parts and location of the parts, and extraction of per part features. In FIG. 5, part-based backbone 536 and/or part-based backbone 532 can include a part detector to generate part-aware output 544 and part-aware output 524 respectively. A part detector may include one or more machine learning model or one or more signal processing filters. The part-aware output 544 and part-aware output 524 may indicate whether a specific part is present or not present (e.g., a Boolean indicator). The part-aware output 544 and part-aware output 524 may indicate location of a specific part, e.g., bounding box information, or coordinate information identifying location of a part on a bounding box. Part-based backbone 536 and part-based backbone 532 may be concerned with detecting the same set of parts. Part-based backbone 536 and part-based backbone 532 may be concerned with detecting different sets of parts.

The part-aware output 524 can include global features 520 per frame of the sensor data, and one or more part features 530 per frame of the sensor data. The part-aware output 544 can further include one or more bounding boxes corresponding to the one or more part features. One or more part features 530 may include first part features 510, second part features 512, third part features 514, . . . fourth part features 516. For example, first part features 510 may include left light features and bounding box information of the left light. Second part features 512 may include right light features and bounding box information of the right light. Third part features 514 may include left door features and bounding box information of the left door. Fourth part features 516 may include emergency vehicle light bar features and bounding box information of the emergency vehicle light bar. Features may have 0's as values if the part is not detected by part detector. The part-aware output 544 can include global features 580 per frame of the sensor data, and one or more part features 590 per frame of the sensor data. The part-aware output 524 can further include one or more bounding boxes corresponding to the one or more part features. One or more part features 590 may include first part features 560, second part features 562, third part features 564, . . . fourth part features 566. For example, first part features 560 may include left light features and bounding box information of the left light. Second part features 562 may include right light features and bounding box information of the right light. Third part features 564 may include left door features and bounding box information of the left door. Fourth part features 566 may include emergency vehicle light bar features and bounding box information of the emergency vehicle light bar. Features may have 0's as values if the part is not detected by part detector.

Not all part features may be relevant or salient for a task or task group. For example, extraction of open door attributes may not need to process part features associated with emergency vehicle light bars. A task group may have certain part features of interest. Extraction of vehicle signal light attributes may benefit from part features associated with left light, right light, front lights, rear lights, etc. To avoid overloading downstream task group specific networks and the cross attention neural network with part information that is not as relevant, a filter may be included to mask selected part features in part-aware output 544 and/or part-aware output 524.

Masking filter 550 may be included to mask certain part features in part-aware output 524 from being provided to the cross attention neural network in the second node 406 (e.g., x-attention fusion part 430), so that features received by the cross attention neural network includes one or more selected part features generated by the part-based backbone 532. Masking filter (not shown explicitly in FIG. 5), may be included to mask certain part features in part-aware output 544 from being provided to the cross attention neural network in the second node 406 (e.g., x-attention fusion part 430), so that features received by the cross attention neural network includes one or more selected part features generated by the part-based backbone 536. The masking may be task group specific so that the part features that are processed by downstream task specific networks are not overloaded with part features that are irrelevant. Masking may also reduce the size of input features to be processed by the cross attention neural network and the downstream task specific models, which would reduce computational complexity.

In FIG. 5, the first node 408 may include a masking filter 552, a masking filter 554, and masking filter 556. Masking filter 552 may mask one or more part features that are not salient for the task group handled by heads 460B. Masking filter 554 may mask one or more part features that are not salient for the task group handled by heads 460C. Masking filter 556 may mask one or more part features that are not salient for the task group handled by heads 460D.

In some cases, it may be beneficial to process the global features and/or part features to extract relationships between them. There may be relationships between features for a certain part and features for another part. There may be relationships between features of a certain part and the global features. If desired, the first node 408 may include one or more part attention neural networks, dedicated to one or more task groups to extract these relationships. The second node 406 may include one or more part attention neural networks, dedicated to one or more task groups to extract these relationships.

A part attention neural network can receive part-aware output 544 or part-aware output 524, or a filtered version of part-aware output 544 or part-aware output 524 (e.g., an output of a masking filter). A part attention neural network may receive global features and/or part features that are salient for a given task group and output a part-attended feature vector for the given task group. The part attention neural network can extract relationships between the part features or between part features and global features and encode the relationships in a part-attended feature vector. The part attention neural network in the first node 408 or the second node 406 can combine part features and global features to extract a part-attended feature vector. In the first node 408, a sequence of part-attended feature vectors for a plurality for timestamps can be provided as input to a temporal network dedicated to the task group (to extract temporal features). In the second node 406, the first features received by a cross attention neural network (e.g., x-attention fusion part 430) may include part-attended feature vectors generated by a part attention neural network in the first node 408 based on part-aware output 524. The second features received by a cross attention neural network (e.g., x-attention fusion part 430) may include part-attended feature vectors generated by a part attention neural network in the second node 406 based on part-aware output 544. Cross attention neural network in the second node 406 may fuse the part-attended feature vectors and provide fused part-attended feature vectors for a plurality of timestamps to temporal network 450A to extract temporal features.

By tuning task groups to utilize certain parts, diagnosis of events (e.g., poor performance of a certain task) can be regressed to parts of a vehicle (making certain events easier to explain). Even though having task group specific networks and parts may increase computational complexity, the task group specific networks are configured to utilize parts that are most relevant to the task group, which can greatly improve performance of the task group. Implementing task group specific networks means that the networks are individually configurable for different task groups to reduce computational complexity when additional processing is not needed for a task group to achieve a certain level of performance. Part-aware processing may reduce load on the cross attention neural network that is performing sensor fusion, by limiting the input data to be fused to part features that are most salient to the task group at hand.

Data to be fused together may also be limited by whether the data is within a desired field of view, or whether the data is located within a threshold distance from the AV. Sensor fusion parts may be disabled if the data is outside of the desired field of view, or beyond a threshold distance. Certain nodes involving sensor fusion to produce inferences for selected task groups may be disabled all together (e.g., if a vehicle of interest is outside of the desired field of view, or beyond a threshold distance). In other words, certain task groups may not be concerned with performing tasks on vehicles that are outside of a desired field of view, and inferences for those task groups may not be needed for vehicles that are outside of the desired field of view. In some embodiments, a task group relating to emergency vehicle subtype classification and emergency vehicle attributes extraction may not be concerned with vehicles which are beyond a threshold distance in front of the ego-vehicle, or with vehicles which are in lanes going in an opposite direction of the ego-vehicle and separated by a physical barrier). Certain task groups may not be concerned with performing tasks for certain vehicles located outside of a desired area surrounding the ego-vehicle or are beyond a threshold distance from the ego-vehicle. In yet another example, a task group may not be relevant when the ego-vehicle is operating within certain driving environments or driving scenarios.

In some cases, the second node 406 in FIGS. 4-5 involving sensor fusion may be deactivated and/or does not perform processing of sensor data corresponding to tracked objects (sensor data A 402) that are not relevant to the task group being handled by heads 460A. Examples of tracked objects that are not relevant may include tracked objects that are beyond a threshold distance from the vehicle, tracked objects that are outside of a desired area surrounding the vehicle, and tracked objects that are outside of a desired field of view.

Figure 6:
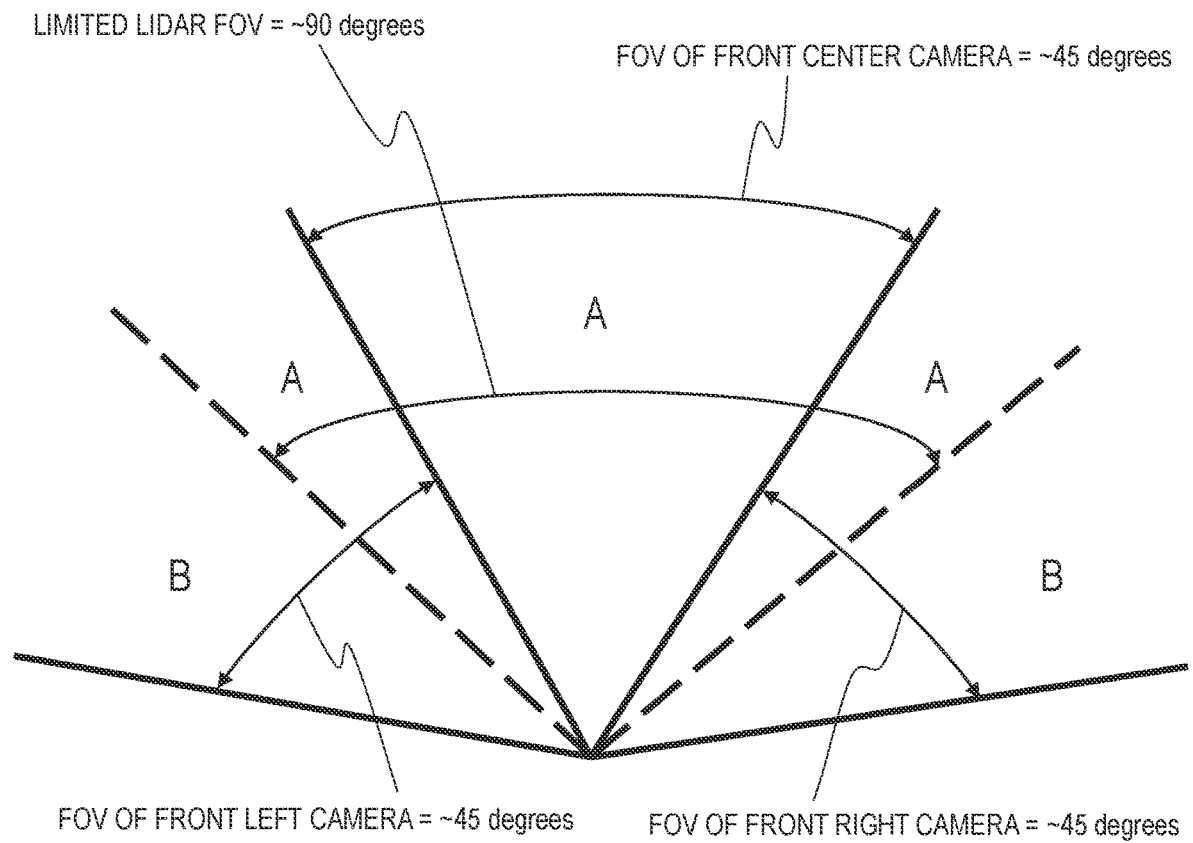
FIG. 6 illustrates different field of views for various sensors and possible techniques to achieve sensor fusion for a desired field of view corresponding to a task group, according to some aspects of the disclosed technology.

FIG. 6 illustrates different field of views for various sensors and possible techniques to achieve sensor fusion for a desired field of view corresponding to a task group, according to some aspects of the disclosed technology. In one example, a task group relating to vehicle open door attributes may have a desired field of view of 90 degrees in front of the vehicle (or in the direction of travel for the vehicle). For a task group that may have a desired field of view of 90 degrees in front of a vehicle, several optimizations can be implemented to reduce sensor data being processed by sensor fusion. A vehicle may include different image sensors with different field of views, and one or more ranging and detection sensors having a certain field of view (e.g., 180 degrees field of view, 270 degrees field of view, 360 degrees field of view). In the illustration shown in FIG. 6, the vehicle has a front center camera with ~45 degrees field of view, a front left camera with ~45 degrees field of view, and a front right camera with ~45 degrees field of view. The vehicle may include additional cameras (e.g., rear center camera with ~45 degrees field of view). Image data from respective cameras may be processed by respective vehicle understanding nodes. The vehicle may include a detection and ranging sensor (e.g., light detection and ranging (LIDAR) sensor, radio detection and ranging (RADAR) sensor, time-of-flight sensor, or the like) having a certain field of view, which may be greater than the desired field of view of 90 degrees.

One optimization may include masking or filtering sensor data from the ranging and detection sensor, so that only sensor data that is inside the desired field of view of 90 degrees are processed by a vehicle understanding node that is generating inferences for the task group. Another optimization may include masking or filtering features extracted by backbones of the vehicle understanding nodes processing respective image data from different cameras, so that only features that are inside the desired field of view of 90 degrees are processed by the cross attention neural network that is performing sensor fusion. In one example, features extracted from image data generated by the front center camera may be fused with features extracted from point clouds limited to the desired field of view. In another example, features extracted from image data generated by the front center camera, features extracted from image data generated by the front left camera, and features extracted from image data generated by the front right camera are fused with fused with features extracted from point clouds limited to the desired field of view. Features extracted from image data generated by other cameras that are outside of the desired field of view can be filtered out and may not undergo sensor fusion to reduce computational complexity.

FIG. 7 illustrates sensor fusion in yet another exemplary multi-task machine learning model for vehicle understanding, according to some aspects of the disclosed technology. The vehicle implementing the illustrated model may have a plurality of image sensors to generate different sensor data 706 having different fields of view. A first image sensor (e.g., camera) may generate first sensor data having a first field of view. A second image sensor (e.g., camera) may generate second sensor data having a second field of view. The vehicle may include a ranging and detection sensor (e.g., LIDAR sensor, RADAR sensor, time-of-flight sensor, or the like) to generate third sensor data 702 having a third field of view.

The vehicle may implement an understanding part that includes a plurality of nodes 792 to extract features from sensor data 706 from respective cameras (or image sensors) having different field of views. The nodes 792 may each include a multi-task learning model to output inferences for the same set of task groups. The nodes may include respective image backbones 720 to generate respective feature vectors 740, and respective task group specific networks 750 (e.g., temporal network and heads) to generate inferences for various task groups. A first node in the nodes 792 may extract features from the first sensor data (from the first image sensor having the first field of view) and output first inferences for a plurality of first task groups. The first node in the nodes 792 may have a shared backbone to extract features from the first sensor data and heads to output inferences for the respective first task groups. A second node in the nodes 792 may extract features from the second sensor data (from the second image sensor having the second field of view) and output second inferences for the first task groups. The second node in the nodes 792 may have a shared backbone to extract features from the second sensor data and heads to output inferences for the respective first task groups. There may be additional nodes in nodes 792 with similar configurations as the first node and the second node, and processes sensor data from other image sensors.

The understanding part may include a third node to perform sensor fusion and output third inferences for a second task group. The third node may include a multi-task learning model to output inferences for the second task group. The third node may include a LIDAR backbone 710 to generate feature vector 730. LIDAR backbone 710 may extract features from sensor data 702 from a ranging and detection sensor. The third node may include a temporal network 780. The third node may include heads 790 to output third inferences for the second task group.

The third node may include a cross attention neural network (e.g., x-attention fusion part 770) to implement sensor fusion at the data level for sensor data having different modalities (e.g., sensor data 702 and sensor data 706). The sensor fusion being performed by the cross attention neural network may improve performance of heads 790. However, sensor fusion is computationally expensive, and the understanding part may include optimizations to reduce the amount of data being received by the cross attention neural network.

In some embodiments, the understanding part may include a first field of view split node 708 to gather sensor data in the third sensor data 702 that is inside the desired field of view and output limited sensor data within the desired field of view. For example, the third sensor data 702 may include point cloud data that has a field of view that is significantly larger than the desired field of view. The point cloud data may have 180 degrees, 270 degrees, or 360 degrees field of view, whereas the desired field of view may be only 90 degrees. The first field of view split node 708 may receive mask 704 that encodes the desired field of view (e.g., as an index mask), and gathers sensor data according to the mask 704 (e.g., gathers elements from third sensor data 702 at indices specified by the index mask). The first field of view split node 708 may provide the limited sensor data to LIDAR backbone 710 for processing and generating of feature vector 730.

In some embodiments, the understanding part may include a second field of view split node 760 to gather features extracted by the first node and the second node (e.g., feature vectors 740) that are inside the desired field of view and to output a reduced set of features 764 within the desired field of view. The second field of view split node 760 may receive mask 704 that encodes the desired field of view and gathers features from feature vectors 740 according to mask 704. The second field of view split node 760 may provide the reduced set of features 764 to the cross attention neural network (e.g., x-attention fusion part 770) for processing.

The cross attention neural network (e.g., x-attention fusion part 770) may process the features extracted from the limited sensor data (e.g., feature vector 730) and the reduced set of features 764, and output fused feature vectors. Fused feature vectors at different timestamps may be processed by temporal network 780. Heads 790 may output third inferences for the second task group, and the performance of heads 790 may benefit from sensor fusion performed by the cross attention neural network. The second task group may include tasks relating to extracting vehicle open door attributes.

In some embodiments, the second field of view of the second image sensor may be outside of the desired field of view, and the features extracted by the second node based on the second sensor data are excluded or are not in the reduced set of features 764 within the desired field of view. For instance, the second image sensor may be a rear center camera, and the desired field of view is 90 degrees forward.

The vehicle may include additional image sensors, such as a third image sensor to generate third sensor data having a third field of view, and a fourth image sensor to generate fourth sensor data having a fourth field of view. The understanding part may include a third node in nodes 792 to extract features from the third sensor data and output third inferences for the first task groups, and a fourth node in nodes 792 to extract features from the fourth sensor data and output fourth inferences for the first task groups. The first field of view, the second field of view, and the third field of view may at least overlap with the desired field of view, whereas the fourth field of view may be outside of the desired field of view. Accordingly, the second field of view split node 760 may gather features extracted by the first node, the second node, and the third node that are inside the desired field of view. The reduced set of features 764 may include features extracted by the first node, the second node, and the third node and does not include features extracted by the fourth node.

The vehicle understanding nodes as illustrated herein may be implemented as engines running on one or more graphical processing units or graphical processors. In some cases, the first field of view split node 708 may be implemented on one or more central processing units to reduce the load on the graphical processing units. In some cases, the second field of view split node 760 may access data within the one or more graphical processing units, and may be implemented on the one or more graphical processing units along side with the vehicle understanding nodes. In some cases, the vehicle understanding nodes may be split into multiple engines, so that the second field of view split node 760 may be implemented outside of the one or more graphical processing units. In those cases, the first field of view split node 708 and/or the second field of view split node 760 may be implemented on one or more central processing units to further reduce the load on the graphical processing units.

Other types of partitioning or masking of sensor data and/or features, besides field of view splitting, are envisioned by the disclosure. Examples may include distance thresholding, geofencing, signal strength thresholding, and the like.

Exemplary Method for Understanding Vehicles

Figure 8:
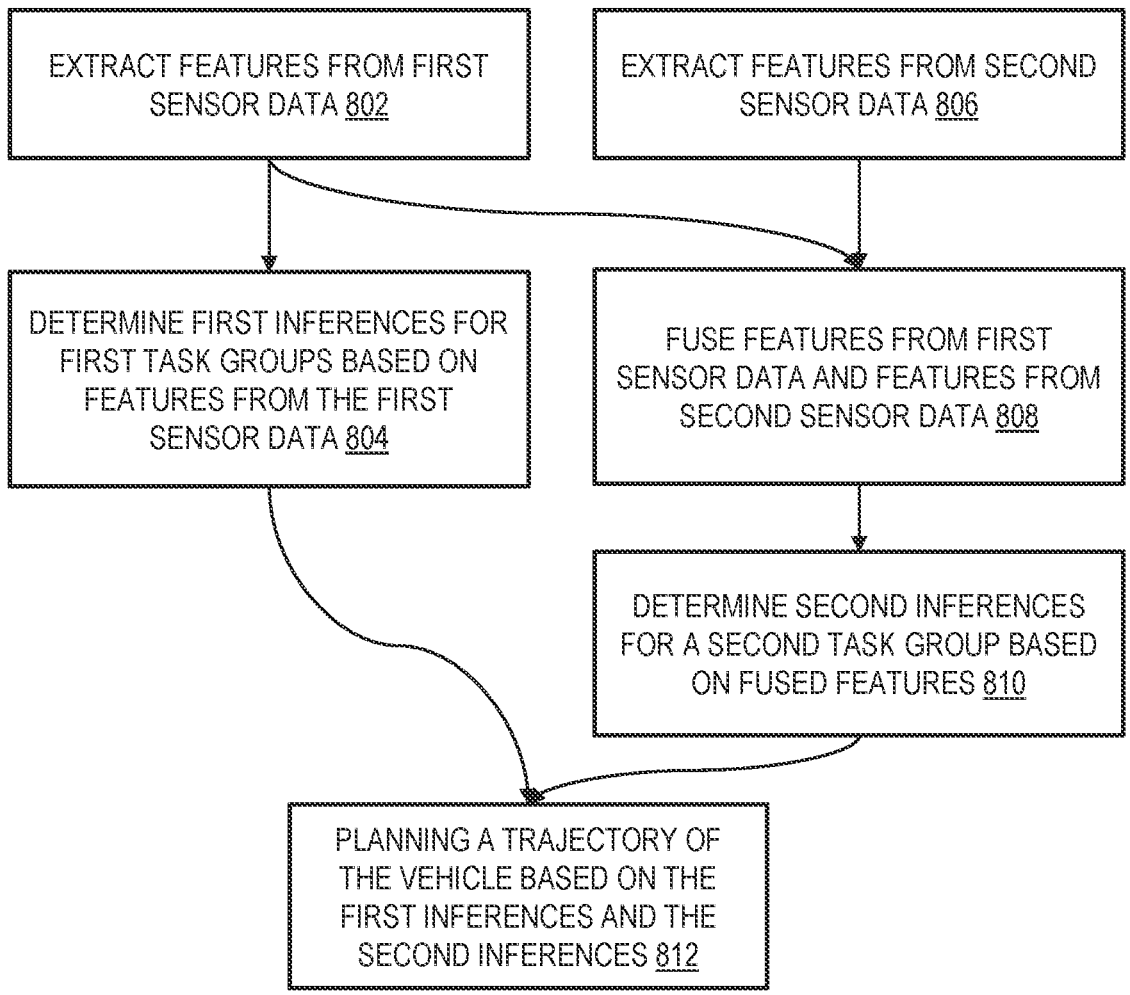
FIG. 8 is a flow diagram of a method for understanding vehicles and controlling a vehicle based on the understanding according to some aspects of the disclosed technology.

FIG. 8 is a flow diagram of a method for understanding vehicles and controlling a vehicle based on the understanding according to some aspects of the disclosed technology. The method may be carried out by components illustrated in the figures. While not shown, a tracker such as tracking part 202 may be implemented to track objects in sensor data.

In 802, a first shared backbone of a first node may extract features from first sensor data generated by a first sensor in a first modality. The first node may extract features from image data. In 804, task group specific heads of the first node may determine first inferences for first task groups based on the features from the first sensor data. The first node may be a multi-task learning model to output inferences for various task groups. The first node does not leverage sensor fusion at the data level. In 806, a second backbone of a second node may extract features from second sensor data generated by a second sensor in a second modality. The second node may extract features from point clouds. In 808, a cross attention neural network of the second node may fuse at least some of the features from the first sensor data (e.g., features extracted from image data) and at least some of the features from the second sensor data (e.g., features extracted from point clouds). The second node, in particular the cross attention neural network, implements and leverages sensor fusion at the data level to generate inferences based on sensor data having two different modalities. In 810, the heads for the second node may determine second inferences for a second task group based on outputs from the cross attention neural network. The second task group may relate to extracting vehicle open door features. The second task group may relate to extracting vehicle signal attributes.

In 812, a planner may plan a trajectory of the vehicle based on the first inferences and second inferences.

In some embodiments, a vehicle understanding fusion part (e.g., vehicle understanding fusion part 306 of FIG. 3), may fuse the first inferences, the second inferences, and other inferences generated by one or more further nodes to form final vehicle understanding inferences.

In some embodiments, extracting the features from the first sensor data in 802 may include outputting global features per frame of the first sensor data, and one or more part features per frame of the first sensor data. In some embodiments, extracting the features from the first sensor data in 802 may include generating, by a part attention neural network, part-attended feature vectors based on the global features and at least a subset of the one or more part features. The first shared backbone of the first node may implement part-aware preprocessing of the first sensor data.

In some embodiments, the at least some of the features from the first sensor data received by the cross attention neural network in the second node may include a subset of the one or more part features of the first sensor data. In some embodiments, the at least some of the features from the first sensor data received by the cross attention neural network in the second node may include the part-attended feature vectors.

In some embodiments, a field of view split node may gather a subset of sensor data generated by the second sensor that is within a desired field of view for the second task group, and provide the subset of sensor data as the second sensor data to the second node. In some embodiments, a further field of view split node may mask out features extracted from the first sensor data that is not within the desired field of view. The at least some of the features from the first sensor data fused by the cross attention neural network may be (limited to features) within the desired field of view.

In some embodiments, a second shared backbone of a third node may extract features from third sensor data generated by a third sensor in the first modality. The third node may extract features from image data from a different image sensor. The features from the third sensor data may be outside of a desired field of view, and the features from the third sensor can be excluded from being provided to the cross attention neural network.

Exemplary AV Management System

Turning now to FIG. 9, this figure illustrates an example of an AV management system 900, in which some of the aspects of the present disclosure can be implemented. One of ordinary skill in the art will understand that, for the AV management system 900 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 900 includes an AV 130, a data center 950, and a client computing device 970. The AV 130, the data center 950, and the client computing device 970 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 130 may navigate about roadways without a human driver based on sensor signals generated by multiple sensor systems 904, 906, and 908. The sensor systems 904-908 may include different types of sensors and may be arranged about the AV 130. For instance, the sensor systems 904-908 may comprise Inertial Measurement Units (IMUs), cameras (e.g., still image cameras, video cameras, thermal cameras, signal cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), time-of-flight sensors, structured light sensor, infrared sensors, signal light sensors, thermal imaging sensors, engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 904 may be a camera system, the sensor system 906 may be a LIDAR system, and the sensor system 908 may be a RADAR system. Other embodiments may include any other number and type of sensors.

AV 130 may also include several mechanical systems that may be used to maneuver or operate AV 130. For instance, mechanical systems may include vehicle propulsion system 930, braking system 932, steering system 934, safety system 936, and cabin system 938, among other systems. Vehicle propulsion system 930 may include an electric motor, an internal combustion engine, or both. The braking system 932 may include an engine brake, a wheel braking system (e.g., a disc braking system that utilizes brake pads), hydraulics, actuators, and/or any other suitable componentry configured to assist in decelerating AV 130. The steering system 934 may include suitable componentry configured to control the direction of movement of the AV 130 during navigation. Safety system 936 may include lights and signal indicators, a parking brake, airbags, and so forth. The cabin system 938 may include cabin temperature control systems, in-cabin entertainment systems, and so forth. In some embodiments, the AV 130 may not include human driver actuators (e.g., steering wheel, handbrake, foot brake pedal, foot accelerator pedal, turn signal lever, window wipers, etc.) for controlling the AV 130. Instead, the cabin system 938 may include one or more client interfaces (e.g., GUIs, Voice User Interfaces (VUIs), etc.) for controlling certain aspects of the mechanical systems 930-938.

AV 130 may additionally include a local computing device 910 that is in communication with the sensor systems 904-908, the mechanical systems 930-938, the data center 950, and the client computing device 970, among other systems. The local computing device 910 may include one or more processors and memory, including instructions that may be executed by the one or more processors. The instructions may make up one or more software stacks or components responsible for controlling the AV 130; communicating with the data center 950, the client computing device 970, and other systems; receiving inputs from riders, passengers, and other entities within the AV's environment; logging metrics collected by the sensor systems 904-908; and so forth. In this example, the local computing device 910 includes a perception, understanding, and tracking part 104, a mapping and localization stack 914, a prediction part 106, a planning part 110, and controls part 112, a communications stack 920, an HD geospatial database 922, and an AV operational database 924, among other stacks and systems.

Perception, understanding, and tracking part 104 may enable the AV 130 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 904-908, the mapping and localization stack 914, the HD geospatial database 922, other components of the AV, and other data sources (e.g., the data center 950, the client computing device 970, third-party data sources, etc.). The perception, understanding, and tracking part 104 may detect and classify objects and determine their current and predicted locations, speeds, directions, and the like. In addition, the perception, understanding, and tracking part 104 may determine the free space around the AV 130 (e.g., to maintain a safe distance from other objects, change lanes, park the AV, etc.). The perception, understanding, and tracking part 104 may also identify environmental uncertainties, such as where to look for moving objects, flag areas that may be obscured or blocked from view, and so forth. Exemplary implementations of perception, understanding, and tracking part 104 are illustrated in the figures.

Prediction part 106 may predict behaviors and movements of tracked objects sensed by perception, understanding, and tracking part 104.

Mapping and localization stack 914 may determine the AV's position and orientation (pose) using different methods from multiple systems (e.g., GPS, IMUs, cameras, LIDAR, RADAR, ultrasonic sensors, the HD geospatial database 922, etc.). For example, in some embodiments, the AV 130 may compare sensor data captured in real-time by the sensor systems 904-908 to data in the HD geospatial database 922 to determine its precise (e.g., accurate to the order of a few centimeters or less) position and orientation. The AV 130 may focus its search based on sensor data from one or more first sensor systems (e.g., GPS) by matching sensor data from one or more second sensor systems (e.g., LIDAR). If the mapping and localization information from one system is unavailable, the AV 130 may use mapping and localization information from a redundant system and/or from remote data sources.

Planning part 110 may determine how to maneuver or operate the AV 130 safely and efficiently in its environment. For instance, the planning part 110 may produce a plan for the AV 130, which can include a (reference) trajectory. Planning part 110 may receive information generated by perception, understanding, and tracking part 104. For example, the planning part 110 may receive the location, speed, and direction of the AV 130, geospatial data, data regarding objects sharing the road with the AV 130 (e.g., pedestrians, bicycles, vehicles, ambulances, buses, cable cars, trains, traffic lights, lanes, road markings, etc.) or certain events occurring during a trip (e.g., an emergency vehicle (EMV) blaring a siren, intersections, occluded areas, street closures for construction or street repairs, DPVs, etc.), user input, and other relevant data for directing the AV 130 from one point to another. The planning part 110 may determine multiple sets of one or more mechanical operations that the AV 130 may perform (e.g., go straight at a specified speed or rate of acceleration, including maintaining the same speed or decelerating; turn on the left-blinker, decelerate if the AV is above a threshold range for turning, and turn left; turn on the right-blinker, accelerate if the AV is stopped or below the threshold range for turning, and turn right; decelerate until completely stopped and reverse; etc.), and select the best one to meet changing road conditions and events.

Controls part 112 may manage the operation of the vehicle propulsion system 930, the braking system 932, the steering system 934, the safety system 936, and the cabin system 938. Controls part 112 may receive a plan from the planning part 110. Controls part 112 may receive sensor signals from the sensor systems 904-908 as well as communicate with other stacks or components of the local computing device 910 or a remote system (e.g., the data center 950) to effectuate the operation of the AV 130. For example, Controls part 112 may implement the final path or actions from the multiple paths or actions provided by the planning part 110. The implementation may involve turning the plan from the planning part 110 into commands for vehicle hardware controls such as the actuators that control the AV's steering, throttle, brake, and drive unit.

The communication stack 920 may transmit and receive signals between the various stacks and other components of the AV 130 and between the AV 130, the data center 950, the client computing device 970, and other remote systems. The communication stack 920 may enable the local computing device 910 to exchange information remotely over a network. Communication stack 920 may also facilitate local exchange of information, such as through a wired connection or a local wireless connection.

The HD geospatial database 922 may store HD maps and related data of the streets upon which the AV 130 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 924 may store raw AV data generated by the sensor systems 904-908 and other components of the AV 130 and/or data received by the AV 130 from remote systems (e.g., the data center 950, the client computing device 970, etc.). In some embodiments, the raw AV data may include HD LIDAR point cloud data, image or video data, RADAR data, GPS data, and other sensor data that the data center 950 may use for creating or updating AV geospatial data as discussed further below with respect to FIG. 5 and elsewhere in the present disclosure.

Data center 950 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 950 may include one or more computing devices remote to the local computing device 910 for managing a fleet of AVs and AV-related services. For example, in addition to managing the AV 130, the data center 950 may also support a ridesharing service, a delivery service, a remote/roadside assistance service, street services (e.g., street mapping, street patrol, street cleaning, street metering, parking reservation, etc.), and the like.

Data center 950 may send and receive various signals to and from the AV 130 and the client computing device 970. These signals may include sensor data captured by the sensor systems 904-908, roadside assistance requests, software updates, ridesharing pick-up and drop-off instructions, and so forth. In this example, the data center 950 includes one or more of a data management platform 952, an Artificial Intelligence/Machine Learning (AI/ML) platform 954, a remote assistance platform 958, a ridesharing platform 960, and a map management platform 962, among other systems.

Data management platform 952 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 950 may access data stored by the data management platform 952 to provide their respective services.

The AI/ML platform 954 may provide the infrastructure for training and evaluating machine learning algorithms for operating the AV 130, the remote assistance platform 958, the ridesharing platform 960, the map management platform 962, and other platforms and systems. Using the AI/ML platform 954, data scientists may prepare data sets from the data management platform 952; select, design, and train machine learning models; evaluate, refine, and deploy the models; maintain, monitor, and retrain the models; and so on.

The remote assistance platform 958 may generate and transmit instructions regarding the operation of the AV 130. For example, in response to an output of the AI/ML platform 954 or other system of the data center 950, the remote assistance platform 958 may prepare instructions for one or more stacks or other components of the AV 130.

The ridesharing platform 960 may interact with a customer of a ridesharing service via a ridesharing application 972 executing on the client computing device 970. The client computing device 970 may be any type of computing system, including a server, desktop computer, laptop, tablet, smartphone, smart wearable device (e.g., smart watch; smart eyeglasses or other Head-Mounted Display (HMD); smart car pods or other smart in-car, on-car, or over-ear device; etc.), gaming system, or other general-purpose computing device for accessing the ridesharing application 972. The client computing device 970 may be a customer's mobile computing device or a computing device integrated with the AV 130 (e.g., the local computing device 910). The ridesharing platform 960 may receive requests to be picked up or dropped off from the ridesharing application 972 and dispatch the AV 130 for the trip.

Map management platform 962 may provide a set of tools for the manipulation and management of geographic and spatial (geospatial) and related attribute data. The data management platform 952 may receive LIDAR point cloud data, image data (e.g., still image, video, etc.), RADAR data, GPS data, and other sensor data (e.g., raw data) from one or more AVs 130, Unmanned Aerial Vehicles (UAVs), satellites, third-party mapping services, and other sources of geospatially referenced data.

In some embodiments, the map viewing services of map management platform 962 may be modularized and deployed as part of one or more of the platforms and systems of the data center 950. For example, the AI/ML platform 954 may incorporate the map viewing services for visualizing the effectiveness of various object detection or object classification models, the remote assistance platform 958 may incorporate the map viewing services for replaying traffic incidents to facilitate and coordinate aid, the ridesharing platform 960 may incorporate the map viewing services into the client application 972 to enable passengers to view the AV 130 in transit enroute to a pick-up or drop-off location, and so on.

Exemplary Processor-Based System

Figure 10:
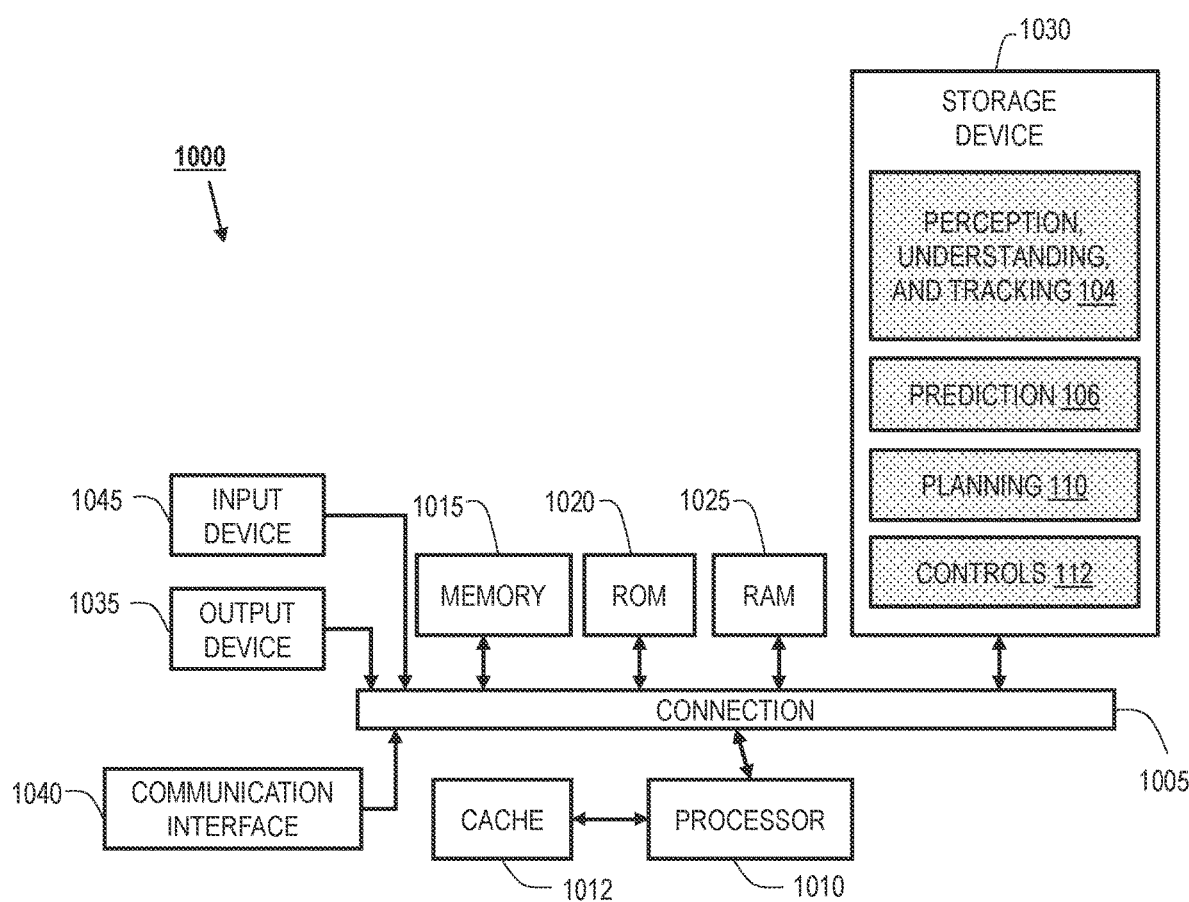
FIG. 10 illustrates an exemplary computing system with which some aspects of the subject technology may be implemented.

FIG. 10 illustrates an exemplary computing system with which some aspects of the subject technology may be implemented. For example, processor-based system 1000 may be any computing device making up, or any component thereof in which the components of the system are in communication with each other using connection 1005. Connection 1005 may be a physical connection via a bus, or a direct connection into processor 1010, such as in a chipset architecture. Connection 1005 may also be a virtual connection, networked connection, or logical connection.

In some embodiments, computing system 1000 represents the local computing device 910 of FIG. 9. In some embodiments, one or more of the described system components represents many such components each performing some or all of the function for which the component is described. In some embodiments, the components may be physical or virtual devices.

Exemplary system 1000 includes at least one processor 1010 and connection 1005 that couples various system components including system memory 1015, such as Read-Only Memory (ROM) 1020 and Random-Access Memory (RAM) 1025 to processor 1010. at least one processor 1010 may include one or more of: Central Processing Unit (CPU), Graphical Processing Unit (GPU), machine learning processor, neural network processor, or some other suitable computing processor. Computing system 1000 may include a cache of high-speed memory 1012 connected directly with, in close proximity to, or integrated as part of processor 1010.

Processor 1010 may include any general-purpose processor and a hardware service or software service. Processor 1010 may essentially be a completely self-contained computing system, containing multiple cores or processors, a bus, memory controller, cache, etc. A multi-core processor may be symmetric or asymmetric.

Storage device 1030 may be a non-volatile and/or non-transitory and/or computer-readable memory device and may be a hard disk or other types of computer-readable media which may store data that is accessible by a computer.

Storage device 1030 may include software services, servers, services, etc., that when the code that defines such software is executed by the processor 1010, it causes the system 1000 to perform a function. Storage device 1030 may store instructions that encode functionalities of perception, understanding, and tracking part 104, prediction part 106, planning part 110, and controls part 112. In some embodiments, a hardware service that performs a particular function may include the software component stored in a computer-readable medium in connection with the necessary hardware components, such as processor 1010, connection 1005, output device 1035, etc., to carry out the function.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms known to those of skill in the art. In some instances, multimodal systems may enable a user to provide multiple types of input/output to communicate with computing system 1000. Computing system 1000 may include communications interface 1040, which may generally govern and manage the user input and system output. The communication interface may perform or facilitate receipt and/or transmission of wired or wireless communications via wired and/or wireless transceivers.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a vehicle comprising: sensors to generate first sensor data in a first modality and second sensor data in a second modality; one or more processors; and one or more storage media encoding instructions executable by the one or more processors to implement an understanding part, wherein the understanding part includes: a first node to output first inferences for a plurality of first task groups, the first node including: a first shared backbone to receive and process first sensor data corresponding to tracked objects having the vehicle classification; and task group specific heads to output first inferences for the first task groups; and a second node to output second inferences for a second task group, the second node including: a second backbone to receive and process second sensor data corresponding to tracked objects having the vehicle classification; a cross attention neural network to receive first features from the first shared backbone and second features from the second backbone; and heads downstream of the cross attention neural network to output inferences for the second task group.

In Example 2, the vehicle of Example 1 can optionally include the first node further including: a plurality of first temporal networks dedicated to respective first task groups.

In Example 3, the vehicle of Example 1 or 2 can optionally include the second node further including: a second temporal network downstream of the cross attention neural network.

In Example 4, the vehicle of any one of Examples 1-3 can optionally include the second inferences comprising two or more vehicle open door attributes.

In Example 5, the vehicle of any one of Examples 1-4 can optionally include the first sensor data comprising image data generated by a camera, and second sensor data comprising point clouds generated by a light detection and ranging sensor.

In Example 6, the vehicle of any one of Examples 1-5 can optionally include the second inferences comprising two or more vehicle signal attributes.

In Example 7, the vehicle of any one of Examples 1-4 and 6 can optionally include the first sensor data comprising color channels image data generated by a camera, and second sensor data comprising signal channel image data generated by the camera.

In Example 8, the vehicle of any one of Examples 1-4 and 6 can optionally include the first sensor data comprises color image data generated by a first camera, and second sensor data comprises signal image data generated by a second camera.

In Example 9, the vehicle of any one of Examples 1-8 can optionally include the first task groups comprising two or more of: a first task group to extract an emergency vehicle classification, extract emergency vehicle subtype classifications, and extract one or more emergency vehicle flashing light attributes, a second task group to extract vehicle signal attributes, a third task group to extract school bus classification, extract one or more school bus flashing light attributes, and extract one or more school bus activeness attributes, a fourth task group to extract vehicle subtype classifications and extract one or more vehicle attributes, and a fifth task group to extract vehicle subtype classifications.

In Example 10, the vehicle of any one of Examples 1-9 can optionally include the cross attention neural network encoding attention relationships between the first features and the second features, and outputs fused features based on the attention relationships.

In Example 11, the vehicle of any one of Examples 1-10 can optionally include the first shared backbone comprising a part-based backbone to output global features per frame of the sensor data, and one or more part features per frame of the sensor data.

In Example 12, the vehicle of Example 11 can optionally include the part-based backbone further outputting one or more bounding boxes corresponding to the one or more part features.

In Example 13, the vehicle of Example 11 or 12 can optionally include the first features received by the cross attention neural network comprising one or more selected part features generated by the part-based backbone.

In Example 14, the vehicle of any one of Examples 11-13 can optionally include the first node further comprising one or more task group specific masking filters to mask the one or more part features.

In Example 15, the vehicle of any one of Examples 11-14 can optionally include the first node further comprising one or more part attention neural networks dedicated to one or more respective task groups to generate part-attended feature vectors.

In Example 16, the vehicle of Example 15, wherein the first node comprises one or more temporal networks to receive part-attended feature vectors for a plurality of timestamps.

In Example 17, the vehicle of any one of Examples 11-16 can optionally include the first features received by the cross attention neural network comprising part-attended feature vectors generated by the first node.

In Example 18, the vehicle of any one of Examples 1-17 can optionally include the understanding part further including a vehicle understanding fusion part to receive the first inferences and the second inferences, and to form final vehicle understanding inferences.

In Example 19, the vehicle of any one of Examples 1-18 can optionally include the second node being deactivated and not performing processing of sensor data corresponding to tracked objects that are beyond a threshold distance from the vehicle.

Example 20 is a vehicle comprising: a first image sensor to generate first sensor data having a first field of view; a second image sensor to generate second sensor data having a second field of view; a first ranging and detection sensor to generate third sensor data having a third field of view; one or more processors; and one or more storage media encoding instructions executable by the one or more processors to implement an understanding part, wherein the understanding part includes: a first node to extract features from the first sensor data and output first inferences for a plurality of first task groups; a second node to extract features from the second sensor data and output second inferences for the first task groups; a first field of view split node to gather sensor data in the third sensor data that is inside the desired field of view and output limited sensor data within the desired field of view; a second field of view split node to gather features extracted by the first node and the second node that are inside the desired field of view and to output a reduced set of features within the desired field of view; and a third node, including: a backbone to extract features from the limited sensor data, a cross attention neural network to process the features extracted from the limited sensor data and the reduced set of features, and heads to output third inferences for a second task group.

In Example 21, the vehicle of Example 20 can optionally include the second task group including extracting vehicle open door attributes.

In Example 22, the vehicle of Example 20 or 21 can optionally include the first node including a shared backbone to extract the features from the first sensor data and heads to output inferences for respective first task groups.

In Example 23, the vehicle of any one of Examples 20-22 can optionally include the second node including a shared backbone to extract the features from the second data and heads to output inferences for respective second task groups.

In Example 24, the vehicle of any one of Examples 20-23 can optionally include the second field of view being outside of the desired field of view, and features extracted by the second node not being in the reduced set of features within the desired field of view.

In Example 25, the vehicle of any one of Examples 20-24 can optionally include third image sensor to generate third sensor data having a third field of view; and fourth image sensor to generate fourth sensor data having a fourth field of view.

In Example 26, the vehicle of Example 25 can optionally include the understanding part further including: a third node to extract features from the third sensor data and output third inferences for the first task groups; and a fourth node to extract features from the fourth sensor data and output fourth inferences for the first task groups.

In Example 27, the vehicle of Example 26 can optionally include: the second field of view split node being to gather features extracted by the first node, the second node, and the third node that are inside the desired field of view; and the reduced set of features including features extracted by the first node, the second node, and the third node and not including features extracted by the fourth node.

In Example 28, the vehicle of any one of Examples 20-27 can optionally include the one or more processors including one or more central processing units and one or more graphical processing units; instructions for the first field of view split node being executed by the one or more central processing units; and instructions for the first node, the second node, the third node, and the second field of view split node being executed by the one or more graphical processing units.

In Example 29, the vehicle of any one of Examples 20-28 can optionally include the one or more processors including one or more central processing units and one or more graphical processing units; instructions for the first field of view split node and the second field of view split node being executed by the one or more central processing units; and instructions for the first node, the second node, and the third node being executed by the one or more graphical processing units.

Example 30 is a computer-implemented method for understanding vehicles and controlling a vehicle based on the understanding, the method comprising: extracting, by a first shared backbone of a first node, features from first sensor data generated by a first sensor in a first modality;

determining, by task group specific heads of the first node, first inferences for first task groups based on the features from the first sensor data; extracting, by a second backbone of a second node, features from second sensor data generated by a second sensor in a second modality; fusing, by a cross attention neural network of the second node, at least some of the features from the first sensor data and at least some of the features from the second sensor data; determining, by heads for the second node, second inferences for a second task group based on outputs from the cross attention neural network; and planning a trajectory of the vehicle based on the first inferences and second inferences.

In Example 31, the computer-implemented method of Example 30 can optionally include: fusing the first inferences, the second inferences, and other inferences generated by one or more further nodes to form final vehicle understanding inferences.

In Example 32, the computer-implemented method of Example 30 or 31 can optionally include extracting the features from the first sensor data comprising: outputting global features per frame of the first sensor data, and one or more part features per frame of the first sensor data.

In Example 33, the computer-implemented method of Example 32 can optionally include the at least some of the features from the first sensor data comprises a subset of the one or more part features of the first sensor data.

In Example 33, the computer-implemented method of Example 32 or 33, wherein extracting the features from the first sensor data comprises: generating, by a part attention neural network, part-attended feature vectors based on the global features and at least a subset of the one or more part features.

In Example 35, the computer-implemented method of Example 34 can optionally include the at least some of the features from the first sensor data comprising the part-attended feature vectors.

In Example 36, the computer-implemented method of any one of Examples 30-35 can optionally include: gathering a subset of sensor data generated by the second sensor that is within a desired field of view for the second task group; and providing the subset of sensor data as the second sensor data to the second node.

In Example 37, the computer-implemented method of Example 36 can optionally include the at least some of the features from the first sensor data fused by the cross attention neural network being within the desired field of view.

In Example 38, the computer-implemented method of any one of Examples 30-37 can optionally include: extracting, by a second shared backbone of a third node, features from third sensor data generated by a third sensor in the first modality; wherein the features from the third sensor data are outside of a desired field of view, and the features from the third sensor are excluded from being provided to the cross attention neural network.

Example 39 includes one or more non-transitory computer-readable media storing instructions that, when executed by one or more processors, cause the one or more processors to perform any one of the computer-implemented methods of Examples 30-38.

Example 40 is an apparatus comprising means to carry out any one of the computer-implemented methods of Examples 30-38.

What is claimed is:

1. A vehicle comprising:
sensors to generate first sensor data in a first modality and second sensor data in a second modality;
one or more processors; and
one or more storage media encoding instructions executable by the one or more processors to implement an understanding part, wherein the understanding part includes:
a first node to output first inferences for a plurality of first task groups, the first node including:
a first shared backbone to receive and process first sensor data corresponding to tracked objects having a vehicle classification; and
task group specific heads to output first inferences for the first task groups; and
a second node to output second inferences for a second task group, the second node including:
a second backbone to receive and process second sensor data corresponding to tracked objects having the vehicle classification;
a cross attention neural network to receive first machine learning features from the first shared backbone and second machine learning features from the second backbone; and
heads downstream of the cross attention neural network to output inferences for the second task group; and
the one or more storage media further encoding instructions for causing the vehicle to:
extract a first set of machine learning features from first sensor data using the first backbone, and determine a set of first inferences based on the first set of machine learning features using the first backbone;
extract machine learning features from a second set of sensor data using the second backbone, fuse the first set of machine learning features and the second set of machine learning features using the cross attention neural network and determining a second set of inferences from the fusion of first machine learning features and second machine learning features;
planning a trajectory of the vehicle using the first inferences and the second inferences; and
automatically implementing the planned trajectory by engaging at least one of a vehicle propulsion system, a braking system, and a steering system.

2. The vehicle of claim 1, wherein the first node further includes:
a plurality of first temporal networks dedicated to respective first task groups.

3. The vehicle of claim 1, wherein the second node further includes:
a second temporal network downstream of the cross attention neural network.

4. The vehicle of claim 1, wherein the second inferences comprise two or more vehicle open door attributes.

5. The vehicle of claim 1, wherein the first sensor data comprises image data generated by a camera, and second sensor data comprises point clouds generated by a light detection and ranging sensor.

6. The vehicle of claim 1, wherein the second inferences comprise two or more vehicle signal attributes.

7. The vehicle of claim 1, wherein the first sensor data comprises color channels image data generated by a camera, and second sensor data comprises signal channel image data generated by the camera.

8. The vehicle of claim 1, wherein the first sensor data comprises color image data generated by a first camera, and second sensor data comprises signal image data generated by a second camera.

9. The vehicle of claim 1, wherein the first task groups comprise two or more of:

a first task group to extract an emergency vehicle classification, extract emergency vehicle subtype classifications, and extract one or more emergency vehicle flashing light attributes, a second task group to extract vehicle signal attributes, a third task group to extract school bus classification, extract one or more school bus flashing light attributes, and extract one or more school bus activeness attributes, a fourth task group to extract vehicle subtype classifications and extract one or more vehicle attributes, and a fifth task group to extract vehicle subtype classifications.

10. The vehicle of claim 1, wherein the cross attention neural network encodes attention relationships between the first machine learning features and the second machine learning features, and outputs fused machine learning features based on the attention relationships.

11. The vehicle of claim 1, wherein the first shared backbone comprises a part-based backbone to output global machine learning features per frame of the sensor data, and one or more part machine learning features per frame of the sensor data.

12. The vehicle of claim 11, wherein the part-based backbone further outputs one or more bounding boxes corresponding to the one or more part machine learning features.

13. The vehicle of claim 11, wherein the first machine learning features received by the cross attention neural network comprise one or more selected part machine learning features generated by the part-based backbone.

14. The vehicle of claim 11, wherein the first node further comprises one or more task group specific masking filters to mask the one or more part machine learning features.

15. The vehicle of claim 1, wherein the second node is deactivated and does not perform processing of sensor data corresponding to tracked objects that are beyond a threshold distance from the vehicle.

16. The vehicle of claim 1, wherein the first set of sensor data has a first modality, the second set of sensor data has a second modality, and the first modality is distinct from the second modality.

* * * * *